(12) United States Patent
Yoshida et al.

(10) Patent No.: US 7,948,666 B2
(45) Date of Patent: May 24, 2011

(54) METHOD AND APPARATUS FOR SETTING CORRECTION VALUE

(75) Inventors: Masahiko Yoshida, Nagano-ken (JP); Keigo Yamasaki, Tokyo (JP); Tatsuya Nakano, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 910 days.

(21) Appl. No.: 11/412,813

(22) Filed: Apr. 28, 2006

(65) Prior Publication Data

US 2006/0256408 A1 Nov. 16, 2006

(30) Foreign Application Priority Data

Apr. 28, 2005 (JP) ................................. 2005-133704

(51) Int. Cl.
G03F 3/08 (2006.01)

(52) U.S. Cl. ......... 358/518; 358/504; 358/406; 358/1.9; 358/461; 347/19

(58) Field of Classification Search ........................ None
See application file for complete search history.

(56) References Cited

U.S. PATENT DOCUMENTS

| | | | | |
|---|---|---|---|---|
| 5,311,332 A * | 5/1994 | Imao et al. | .................. | 358/518 |
| 5,321,468 A * | 6/1994 | Nakane et al. | .................. | 399/42 |
| 5,351,107 A * | 9/1994 | Nakane et al. | .................. | 399/49 |
| 5,553,199 A * | 9/1996 | Spaulding et al. | .................. | 358/1.9 |
| 5,797,690 A * | 8/1998 | Iwamura et al. | .................. | 400/124.01 |
| 5,974,276 A * | 10/1999 | Oogi | .................. | 399/46 |
| 6,055,073 A * | 4/2000 | Nomura et al. | .................. | 358/518 |
| 6,078,401 A * | 6/2000 | Kanamori | .................. | 358/1.16 |
| 6,223,007 B1 * | 4/2001 | Kitagawa et al. | .................. | 399/49 |
| 6,501,850 B2 * | 12/2002 | Setchell, Jr. | .................. | 382/162 |
| 6,582,050 B2 * | 6/2003 | Akiyama | .................. | 347/19 |
| 6,650,849 B2 * | 11/2003 | Shimura | .................. | 399/49 |
| 6,714,673 B1 * | 3/2004 | Ohta | .................. | 382/167 |
| 6,897,978 B1 * | 5/2005 | Ohta | .................. | 358/1.9 |
| 6,975,418 B1 * | 12/2005 | Ohta et al. | .................. | 358/1.15 |
| 7,101,017 B2 * | 9/2006 | Endo et al. | .................. | 347/19 |
| 7,103,290 B2 * | 9/2006 | Koie et al. | .................. | 399/15 |
| 7,150,511 B2 * | 12/2006 | Oguri et al. | .................. | 347/19 |
| 7,151,612 B2 * | 12/2006 | Mikami | .................. | 358/1.14 |
| 7,396,099 B2 * | 7/2008 | Teshigawara et al. | .................. | 347/19 |
| 7,460,284 B2 * | 12/2008 | Hiromatsu | .................. | 358/518 |
| 7,600,844 B2 * | 10/2009 | Morimoto | .................. | 347/19 |
| 2001/0026372 A1 * | 10/2001 | Misawa | .................. | 358/1.9 |
| 2001/0035889 A1 * | 11/2001 | Mikami | .................. | 347/19 |
| 2002/0067519 A1 * | 6/2002 | Suzuki et al. | .................. | 358/519 |
| 2004/0021724 A1 * | 2/2004 | Kojima | .................. | 347/19 |
| 2004/0141209 A1 * | 7/2004 | Marumoto et al. | .................. | 358/3.26 |
| 2005/0264834 A1 * | 12/2005 | Asai et al. | .................. | 358/1.9 |

* cited by examiner

*Primary Examiner* — King Y Poon
*Assistant Examiner* — Dung D Tran
(74) *Attorney, Agent, or Firm* — Sughrue Mion, PLLC

(57) ABSTRACT

At the time of setting a correction value for a certain density (subject density), a higher side density that is higher than the certain density and a lower side density that is lower than the certain density to be referenced according to the measured value of a region printed at the certain density are arbitrarily specified, and a correction value for the certain density is set by using at least one of a measured value of the density of a region printed at the arbitrarily specified higher side density and a measured value of the density of a region printed at the arbitrarily specified lower side density.

1 Claim, 19 Drawing Sheets

Upper end process area correction value

| Row region number | Cyan | | | Magenta | | | Yellow | | | Black | | |
|---|---|---|---|---|---|---|---|---|---|---|---|---|
| | Density 2 | Density 3 | Density 4 | Density 2 | Density 3 | Density 4 | Density 2 | Density 3 | Density 4 | Density 2 | Density 3 | Density 4 |
| 1 | C2_1 | C3_1 | C4_1 | M2_1 | M3_1 | M4_1 | Y2_1 | Y3_1 | Y4_1 | K2_1 | K3_1 | K4_1 |
| 2 | C2_2 | C3_2 | C4_2 | M2_2 | M3_2 | M4_2 | Y2_2 | Y3_2 | Y4_2 | K2_2 | K3_2 | K4_2 |
| 3 | C2_3 | C3_3 | C4_3 | M2_3 | M3_3 | M4_3 | Y2_3 | Y3_3 | Y4_3 | K2_3 | K3_3 | K4_3 |
| ⋮ | ⋮ | | | ⋮ | | | ⋮ | | | ⋮ | | |

METHOD AND APPARATUS FOR SETTING CORRECTION VALUE

CROSS-REFERENCE TO RELATED APPLICATIONS

The present application claims priority upon Japanese Patent Application No. 2005-133704 filed on Apr. 28, 2005, which is herein incorporated by reference.

BACKGROUND

1. Technical Field

The present invention relates to methods and apparatuses for setting correction values by setting correction values based on measured values obtained by measuring the density of a test pattern.

2. Related Art

In printing apparatuses such as inkjet printers, the density of a test pattern that is printed by a printing apparatus is measured to obtain a measured value, and ink ejection condition is adjusted based on the obtained measured value (For example, see JP-A-2-54676).

In order to meet a recent demand for higher image quality, it is conceived to set adjusting information (correction values, for example) for each density of the printed image. However, it is difficult to include every level of density in the test pattern. Therefore, it is conceived to constitute the test pattern with typical density, and obtain correction values using measured values of the typical density. For example, it is conceived that a pair of density that are the closest to a subject density is specified, and correction values are set using measured values of this pair of density.

However, measured values of density vary depending on each type of ink. For example, even with patterns printed at the same gradation value, the measured values of density vary depending on each ink color, and each type of color material used. For this reason, if such a pair of density is specified uniformly, depending on the type of ink, precision of set correction values may be impaired.

SUMMARY

The present invention has been devised in consideration of these issues, and it is an object thereof to improve precision of correction values to be set.

A primary aspect of the present invention for achieving the above-described object is a method for setting correction value including a step of obtaining a measured value of density associated with each region by measuring density of a test pattern including a plurality of regions printed based on different command density; and a step of, at the time of setting a correction value for a certain density, specifying arbitrarily each of a higher side density that is higher than the certain density and a lower side density that is lower than the certain density that are to be referenced according to the measured value of a region printed at the certain density; and a step of setting a correction value for the certain density by using at least one of a measured value of the density of a region printed at the higher side density that is arbitrarily specified, and a measured value of the density of a region printed at the lower side density that is arbitrarily specified.

Other features of the present invention will be made clear by the present specification with reference to the accompanying drawings.

DESCRIPTION OF EXEMPLARY EMBODIMENTS

Figure 1:
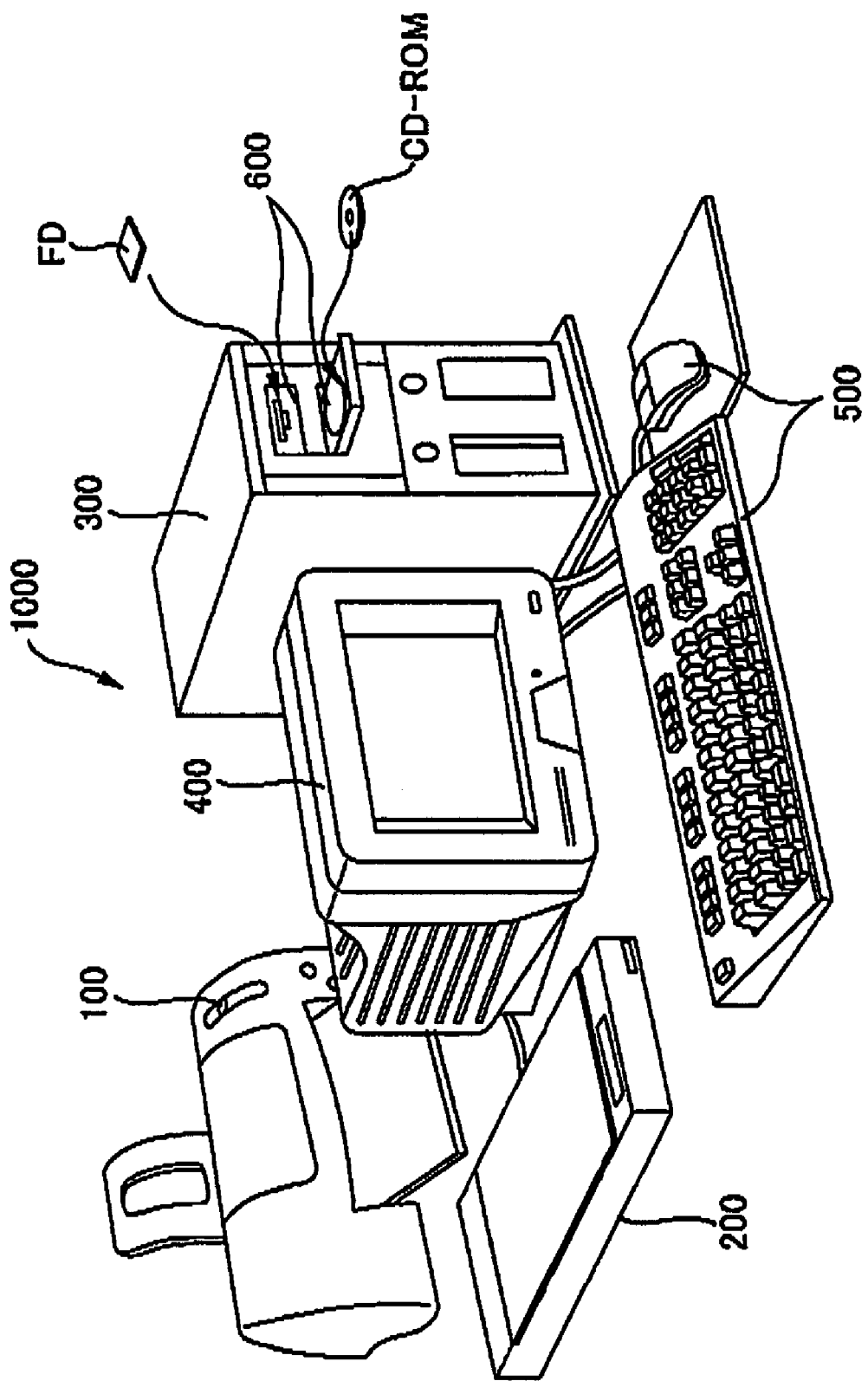
FIG. 1 is a diagram explaining the configuration of a correction value setting system.

At least the following matters will be made clear by the explanation in the present specification and the description of the accompanying drawings.

It is possible to achieve a method for setting a correction value including a step of obtaining a measured value of density associated with each region by measuring density of a test pattern including a plurality of regions printed based on different command density; and, a step of, at the time of setting a correction-value for a certain density, specifying arbitrarily each of a higher side density that is higher than the certain density and a lower side density that is lower than the certain density that are to be referenced according to the measured value of a region printed at the certain density; and a step of setting a correction value for the certain density by using at least one of a measured value of the density of a region printed at the higher side density that is arbitrarily specified, and a measured value of the density of a region printed at the lower side density that is arbitrarily specified.

With such a method for setting correction values, correction values for a certain density are set using at least one of a measured value of density of a region that is printed at an arbitrarily specified higher side density, and a measured value of density of a region that is printed at an arbitrarily specified lower side density. Therefore, it is possible to use a measured value of density suitable for the type of ink. As a result, precision of set correction values can be improved.

In such a method for setting a correction value, in the step of obtaining a measured value of density, the density of a test pattern printed on a medium is measured by repeating in alternation an operation for causing ink to be ejected toward the medium while a print head is moved in a movement direction, and an operation for carrying the medium in a carrying direction that intersects the movement direction.

With such a method for setting correction values, in printing apparatuses that repeat in alternation an operation for ejecting ink while the print head is moved and an operation for carrying a medium, precision of correction values can be improved.

In such a method for setting a correction value, in the step of obtaining a measured value of density, the density of the test pattern is measured for each of a plurality of row regions lined up in the carrying direction, and a measured value of density is obtained associated with the region and the row region.

With such a method for setting correction values, measured values of density can be obtained for the respective row regions, so that it is possible to set correction values in accordance with non-uniformity in density in the carrying direction.

In such a method for setting a correction value, in the step of obtaining a measured value of the density, the density of a test pattern including a plurality of groups composed of a plurality of the regions for each type of ink is measured, and a measured value of density associated with each of the regions is obtained.

With such a method for setting correction values, one test pattern includes a group consisting of a plurality of regions printed in each type of ink. Therefore, it is possible to arrange the print condition for each type of ink. As a result, precision of correction values can be improved.

In such a method for setting a correction value, in the step of specifying arbitrarily each of the higher side density and the lower side density, the higher side density and the lower side density are each specified arbitrarily, based on higher side density information and lower side density information to be referenced that are stored in a memory.

With such a method for setting correction values, a higher side density and a lower side density are specified based on information stored in a memory, an operation for inputting information can be omitted, and working efficiency can be improved.

In such a method for setting a correction value, in the step for setting a correction value for the certain density, a correction value for the certain density is set for each of the row regions.

With such a method for setting correction values, since correction values are set for each row region, it is possible to correct non-uniformity in density of each of the row regions in the printed image with good precision.

In such a method for setting a correction value, in the step for setting a correction value for the certain density, a correction value for the certain density is set based on at least one combination of a measured value of the density of a region printed at the higher side density that is arbitrarily specified and a print command value corresponding to the higher side density, and a combination of a measured value of the density of a region printed at the lower side density that is arbitrarily specified and a print command value corresponding to the lower side density, and a combination of a measured value of the density at the certain density and a print command value corresponding to the certain density.

With such a method for setting correction values, since correction values are set based on a combination of a measured value of density and a corresponding print command value, it is possible to set correction values with good precision.

In such a method for setting a correction value, in the step for setting a correction value for the certain density, a correction value for the certain density is set using linear interpolation.

With such a method for setting correction values, setting of correction values can be simplified.

It is also possible to achieve a method for setting a correction value including a step of obtaining a measured value of density associated with both the region and the row region, by measuring density of a test pattern that includes a plurality of groups composed of a plurality of regions for each type of ink that are printed on a medium in different density by repeating in alternation an operation for causing ink to be ejected toward the medium while a print head is moved in a movement direction, and an operation for carrying the medium in a carrying direction that intersects the movement direction for each of a plurality of row regions lined up in the carrying direction; and a step of, at the time of setting a correction value for a certain density, specifying arbitrarily a higher side density that is higher than the certain density and a lower side density that is lower than the certain density to be referenced according to the measured value of a region printed at the certain density, based on higher side density information and lower side density information to be referenced that are stored in a memory; and a step of setting a correction value for the certain density for each of the row regions by using linear interpolation based on at least one of a combination of a measured value of the density of a region printed at the arbitrarily specified higher side density and a print command value corresponding to the higher side density, and a combination of a measured value of the density of a region printed at the arbitrarily specified lower side density and a print command value corresponding to the lower side density, and a combination of a measured value of the density at the certain density and a print command value corresponding to the certain density.

With such a method for setting correction values, it is possible to substantially achieve all the effects stated above, therefore the object of the present invention is achieved in the most effective manner.

It is also possible to achieve a correction value setting apparatus including a scanner that measures density of a test pattern including a plurality of regions printed based on different command density; a controller that obtains a measured value of density associated with each of the regions, at the time of setting a correction value for a certain density, specifying arbitrarily each of a higher side density that is higher than the certain density and a lower side density that is lower than the certain density that are to be referenced according to the measured value of a region printed at the certain density, and setting a correction value for the certain density by using at least one of a measured value of the density of a region printed at the higher side density that is arbitrarily specified, and a measured value of the density of a region printed at the lower side density that is arbitrarily specified.

Regarding the Correction Value Setting System

<Overview of the Correction Value Setting System>

FIG. 1 is a diagram explaining the configuration of a correction value setting system 1000. The correction value setting system 1000 is for setting correction values for correcting the density of printed images and for causing a printing apparatus to store those set correction values. Therefore, it can be said that the correction value setting system 1000 includes a device for setting correction values. The correction value setting system 1000 is installed at, for example, factories. It is also possible to construct the correction value setting system 1000 on the side of users. In such a case, the correction value setting system 1000 serves as a system for setting new correction values (in other words, for updating correction values). A printing apparatus is an apparatus for printing an image onto a medium as represented by printers, plotters, facsimiles and the like. For the sake of convenience, in the following description, a printer 100, which is a typical printing apparatus, and paper S, which is a typical medium (see FIG. 8), are used as an example.

The correction value setting system 1000 includes, at least, a density measuring device for measuring the density of a test pattern, and a correction value setting controlling device that is communicably connected to the density measuring device and a printing apparatus in which correction values are stored. The correction value setting system 1000 illustrated in FIG. 1 has a scanner 200 as the density measuring device, a computer 300 as the correction value setting controlling device, a display device 400, an input device 500, and a recording and reproduction device 600. In FIG. 1, the printer 100 is shown as a printing apparatus in which correction values are stored. Also, a keyboard and a mouse are shown as the input device 500, and a flexible disk drive unit and a CD-ROM drive unit are shown as the recording and reproduction device 600. Hereinafter, the devices constituting the correction value setting system 1000 are described.

<Regarding the Computer 300>

Figure 2:
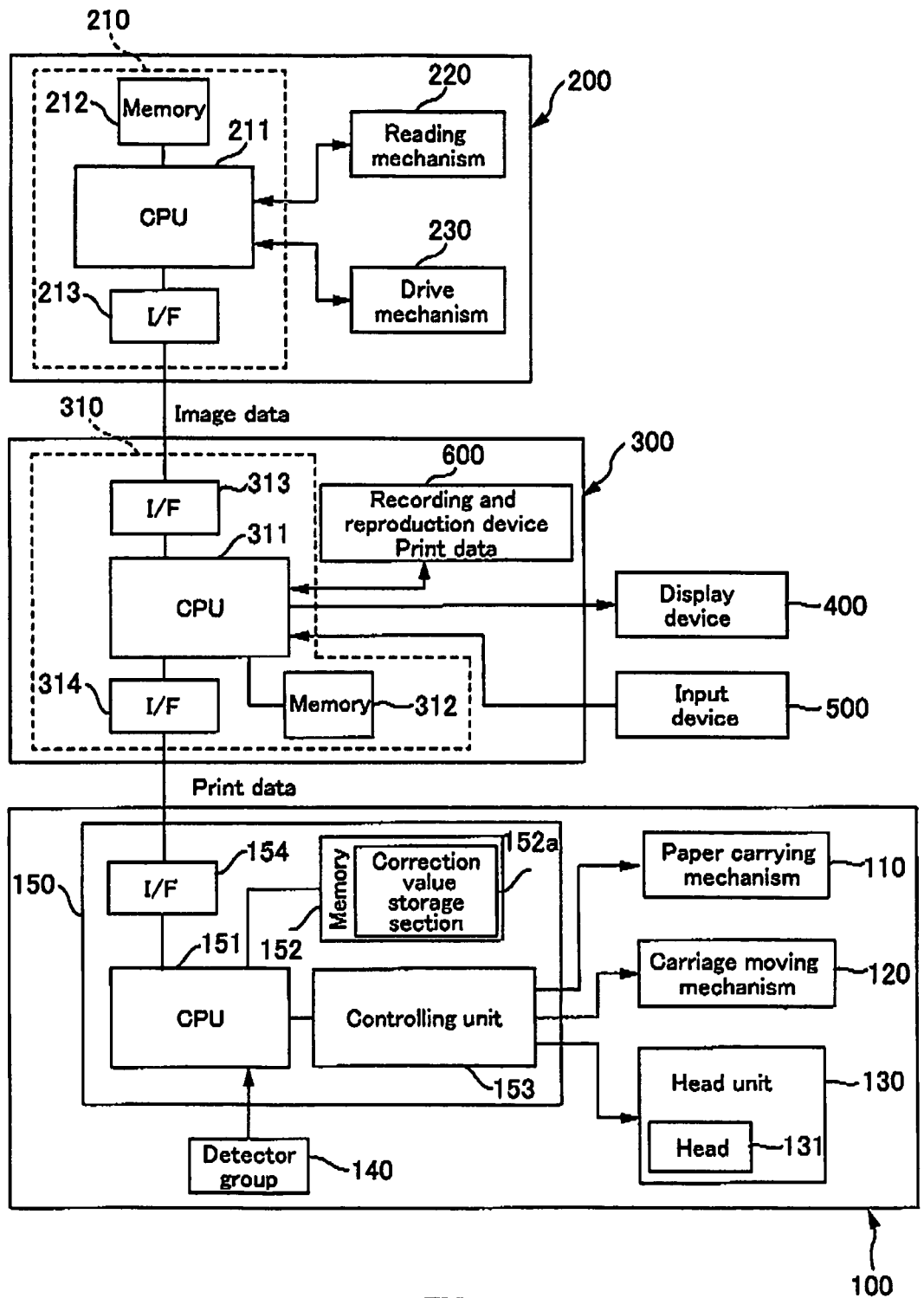
FIG. 2 is a block diagram explaining the overall configuration of the correction value setting system.
Figures 3, 4:
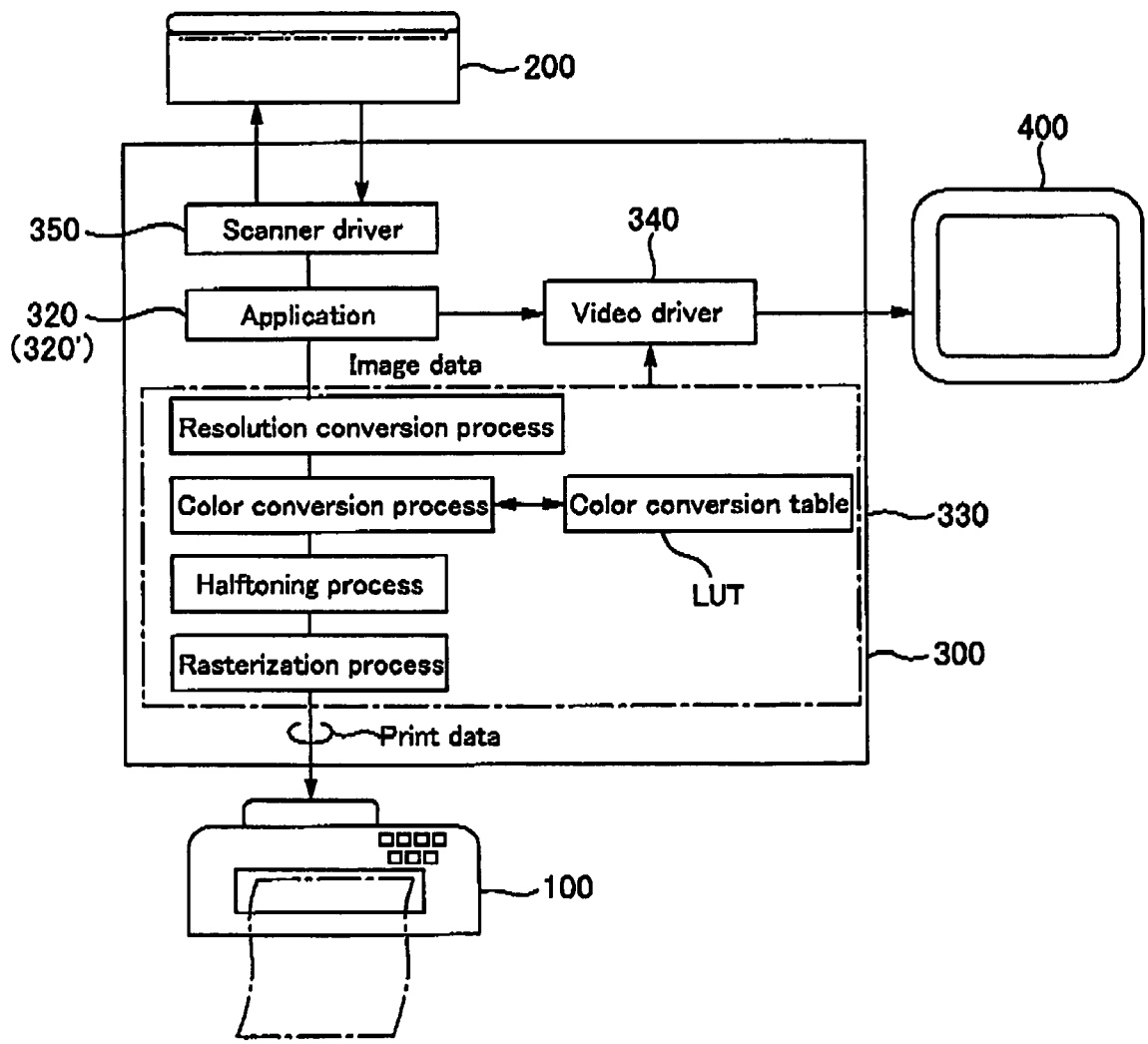
FIG. 3 is a diagram for explaining a read density data table.
FIG. 4 is a diagram explaining processes based on a printer driver.
Figure 5:
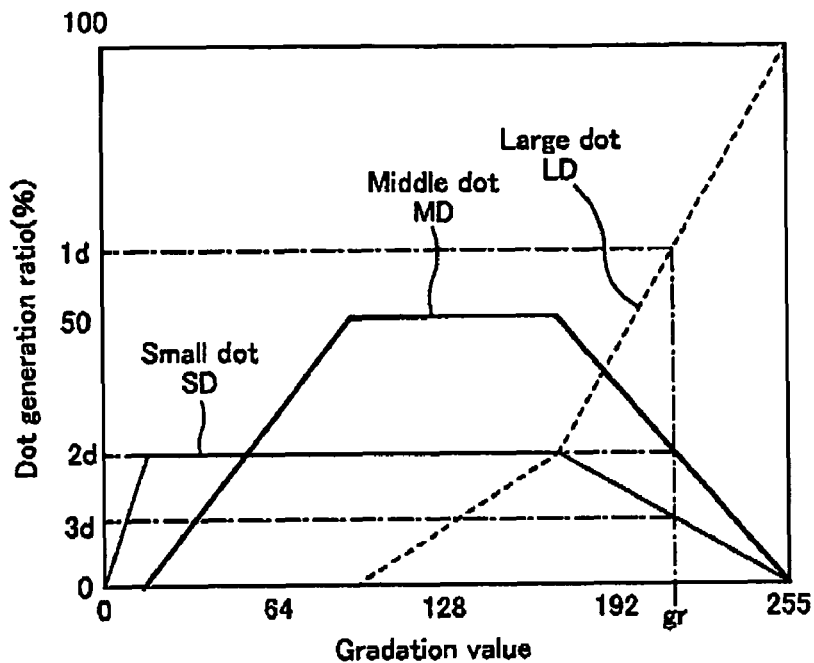
FIG. 5 is a diagram explaining the relation between the gradation value and the dot generation ratio.

First, the computer 300 is described. FIG. 2 is a block diagram explaining the overall configuration of the correction value setting system 1000. FIG. 3 is a diagram for explaining a read density data table. FIG. 4 is a diagram explaining processes based on a printer driver 330. FIG. 5 is a diagram explaining the relation between the gradation value and the dot generation ratio.

The computer 300 is in charge of the control in the correction value setting system 1000. For example, the computer 300 obtains the density of an image printed on the paper S by controlling the scanner 200, causes an image to be printed on the paper S by controlling the printer 100, or stores correction values in a memory 152 (a correction value storage section 152a) of the printer 100. Therefore, the computer 300 is communicably connected to the scanner 200 and the printer 100.

The computer 300 includes a host-side controller 310. The host-side controller 310 includes a CPU 311, a memory 312, a first interface section 313, and a second interface section 314. The CPU 311 is a computation processing unit for performing the overall control of the computer 300. The recording and reproduction device 600, the display device 400, and the input device 500 are communicably connected to the CPU 311. Note that the recording and reproduction device 600 is attached to a housing of the computer 300. The memory 312 is for reserving an area for storing computer programs used by the CPU 311 and a working area, for example, and is constituted by a RAM, an EEPROM, a ROM, or a magnetic disk device, for example. The first interface section 313 is interposed between the computer 300 and the scanner 200, and exchanges data with the scanner 200. The second interface section 314 is interposed between the computer 300 and the printer 100, and exchanges data with the printer 100.

Examples of computer programs installed on the memory 312 include an application program 320, a printer driver 330, a video driver 340 and a scanner driver 350. The application program 320 means, in the broad sense, a computer program for causing the computer 300 to carry out a desired operation. The application program 320 in the correction value setting system 1000 serves as a computer program for causing the computer 300 to function as the correction value setting controlling device (for the sake of convenience, this program is also referred to as "correction value setting program 320'"). The printer driver 330 is a computer program for causing the printer 100 to be operated by the computer 300. The video driver 340 is a computer program for displaying display data from the application program 320 or the printer driver 330 on the display device 400. The scanner driver 350 is a computer program for causing the scanner 200 to be operated by the computer 300. Also as shown in FIG. 3, the correction value setting system 1000 uses a part of the area of the memory 312 of the host-side controller 310 as a data table for storing the read density (corresponding to measured density values.)

The CPU 311 performs various controls according to the computer programs stored in the memory 312. For example, the CPU 311 performs control for obtaining the density of an image printed onto paper S using the correction value setting program 320' and the scanner driver 350. Also, the CPU 311 performs control for causing an image to be printed onto the paper S using the correction value setting program 320' and the printer driver 330.

The CPU 311 carries out the following processes, for example, in the control for printing an image. Upon receiving a print command via a user interface, the CPU 311 converts image data to print data. The print data is data in a format that can be understood by the printer 100, and includes pixel data and various command data. The command data is data for instructing the printer 100 to carry out a specific operation and includes, for example, data for instructing paper supply, data for indicating a carry amount, and data for instructing paper discharge. The CPU 311 performs processes such as resolution conversion, color conversion, halftoning and rasterization, in order to convert the image data into the print data. The pixel data is data relating to dots formed on paper (data for dot color and size, for example), and is generated for each unit region. The unit region refers to a rectangular region that is virtually defined on a medium such as paper, with its size and form being determined according to the print resolution. For example, if the print resolution is 720 dpi (movement direction)×720 dpi (carrying direction), the unit region is a square region of a size of approximately 35.28 µm×35.28 µm (≈1/720 inch×1/720 inch). If the print resolution is 360 dpi×720 dpi, the unit region is a rectangular region of a size of approximately 70.56 µm×35.28 µm (≈1/360 inch×1/720 inch). When ink (ink in a droplet form, also referred to as ink droplet) is ejected in an ideal condition, it lands on the central position of this unit region and subsequently spreads on a medium, thus forming a dot in the unit region.

Resolution conversion process is a process in which image data (text data, image data, etc.) is converted to image data of a resolution for printing an image on the paper S (dot spacing for printing, also referred to as "print resolution".) Color conversion process is a process for converting each RGB pixel data of RGB image data into data with multiple gradation values (for example, 256 grades) expressed in CMYK color space. Here, C, M, Y and K represent the colors of ink. Specifically, "C" stands for cyan. Further, "M" stands for magenta, "Y" for yellow, and "K" for black. This color conversion process is performed by referencing a table (color conversion lookup table LUT) that associates RGB gradation values with CMYK gradation values. Halftoning process is a process for converting CMYK pixel data with multiple gradation values into CMYK pixel data with a few gradation values that can be expressed by the printer 100. For example, through halftoning process, CMYK pixel data representing 256 gradation values is converted into 2-bit CNYK pixel data indicating four gradation values. The 2-bit CMYK pixel data is data that indicates, for each color, "no dot formation" (binary value "00"), "small dot formation" (binary value "01"), "medium dot formation" (binary value "10"), and "large dot formation" (binary value "11"), for example. The generation ratio of each of these dots is determined corresponding to the gradation value. For example, as shown in FIG. 5, with respect to a pixel for which the gradation value gr is specified, the generation ratio of these dots is 1d for the large dot, 2d for the medium dot, and 3d for the small dot. In the halftoning process, methods such as dithering, gamma correction, and error diffusion are used. Rasterization process is a process for reordering the CMYK image data that has been subjected to halftoning process into an order of data to be transferred to the printer 100. Rasterized data is outputted to the printer 100 as the print data described above.

<Regarding the Scanner 200>

Figure 6:
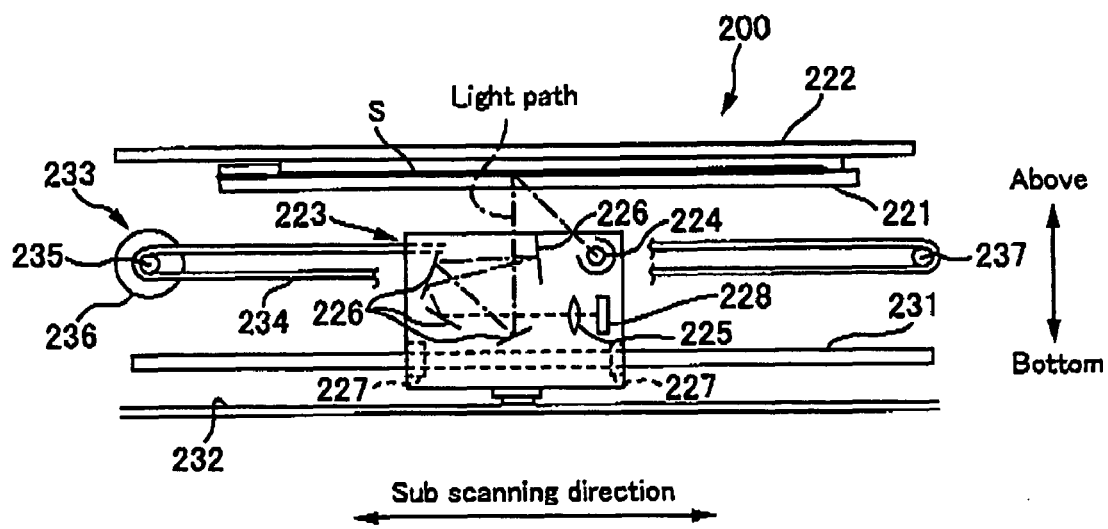
FIG. 6 is a front view for explaining the internal configuration of a scanner.
Figure 7:
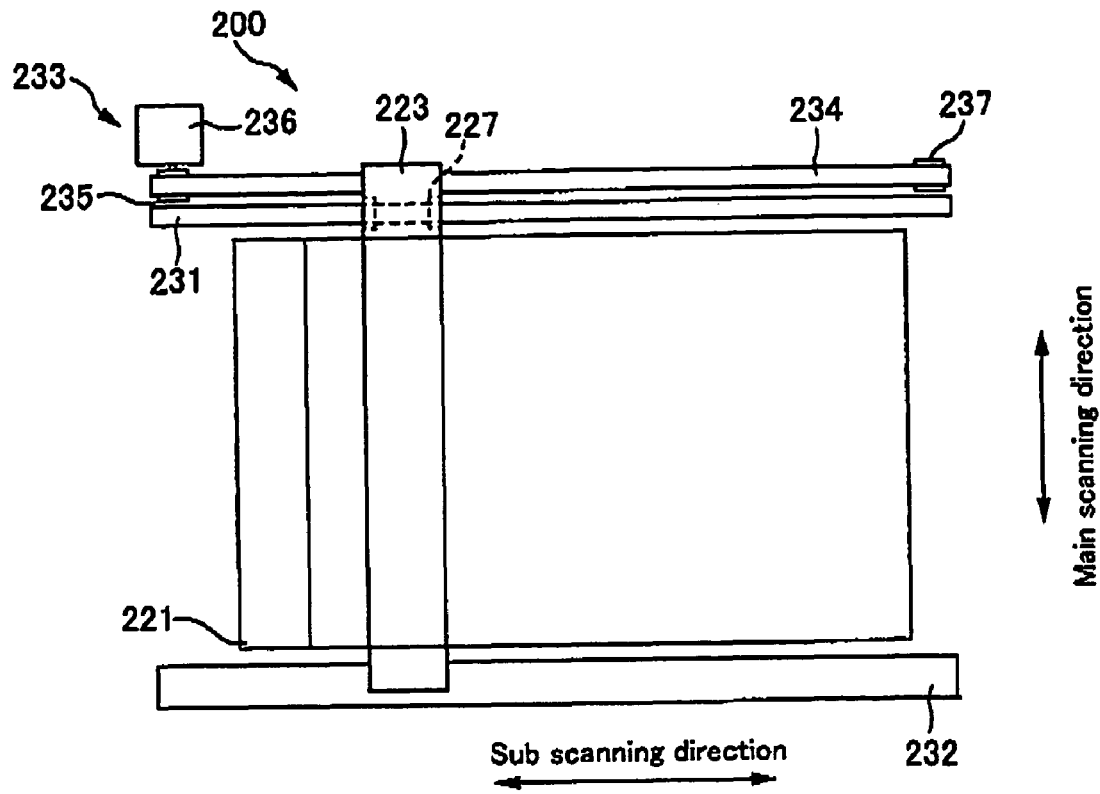
FIG. 7 is a plan view for explaining the configuration of the scanner.

Next, the scanner 200 is described. FIG. 6 is a front view for explaining the internal configuration of the scanner 200. FIG. 7 is a plan view for explaining the configuration of the scanner 200. For the sake of convenience, in FIG. 7, the scanner 200 is illustrated in a state in which an original table cover 222 is removed. FIG. 2 is also referred to in the following description. As shown in FIG. 2, the scanner 200 includes a scanner-side controller 210, a reading mechanism 220, and a drive mechanism 230.

The scanner-side controller 210 includes a CPU 211, a memory 212, and an interface section 213. The CPU 211 is a computation processing device for performing the overall control of the scanner 200. The CPU 211 is communicably connected to the reading mechanism 220 and the drive mechanism 230. The memory 212 is for reserving an area for storing computer programs used by the CPU 211 and a working area, for example, and is constituted by a RAM, an EEPROM, or a ROM, for example. The interface section 213 is interposed between the computer 300 and the scanner 200 for data exchange.

As shown in FIGS. 6 and 7, the reading mechanism 220 includes an original table glass 221, and the original table cover 222, and a reading carriage 223. The original table glass 221 is a transparent glass plate on which an original (paper S on which an image is printed, for example) is placed. The original table cover 222 is for pressing a surface of the original to be read against the original table glass 221. The reading carriage 223 corresponds to a reading section for reading density of the original, and also can be referred to as a measuring section for measuring density of the original. The reading carriage 223 faces the surface of the original to be read via the original table glass 221, and is moved in a predetermined direction (hereinafter also referred to as "sub-scanning direction") along the original table glass 221, keeping a constant spacing. The reading carriage 223 includes an exposure lamp 224, a lens 225, a plurality of mirrors 226, and a guide supporting section 227, and a CCD image sensor 228. The exposure lamp 224 is used as a light source while reading the original. The lens 225 is for collecting light reflected by the original. The mirrors 226 are for guiding the reflected light to the lens 225. The guide supporting section 227 is a portion into which a regulating guide 231 is inserted. The CCD image sensor 228 is for receiving the reflected light collected by the lens 225. In the illustrated scanner 200, the CCD image sensor 228 is configured as so called linear sensor. In other words, the CCD image sensor 228 has a plurality of photodiodes to convert light signals to electrical signals. These photodiodes are arranged in a row. Specifically, these photodiodes are arranged in a direction that is substantially perpendicular to the sub-scanning direction in which the reading carriage 223 is moved (hereinafter also referred to as "main scanning direction"). When an image drawn on the original is read, each photodiode detects the amount of light emitted during a predetermined period. In this way, it is possible to obtain density data that indicates density of the image. In short, image density is measured.

The drive mechanism 230 includes the regulating guide 231, a supporting rail 232, and a drive section 233. The regulating guide 231 is for regulating the movement direction of the reading carriage 223. The supporting rail 232 is for supporting the reading carriage 223. The drive section 233 is for moving the reading carriage 223 in the sub-scanning direction, and includes a timing belt 234, a drive pulley 235, a pulse motor 236, and an idler pulley 237. The timing belt 234 is a circular member affixed to the reading carriage 223 at an end portion thereof, and is extended between the drive pulley 235 and the idler pulley 237. The drive pulley 235 is engaged with the timing belt 234, and attached to the rotation shaft of the pulse motor 236. The pulse motor 236 serves as a driving source when moving the reading carriage 223, and is disposed on one side in the sub-scanning direction. The idler pulley 237 is for supplying tension to the timing belt 234, and is disposed at the other end in the sub-scanning direction that is the side opposite to the drive pulley 235. The reading carriage 223 moves along the regulating guide 231 as carried by the timing belt 234. At this time, the operation of the pulse motor 236 is controlled by the scanner-side controller 210.

The scanner 200 is provided with a home position sensor (not shown). The home position sensor is for detecting whether the reading carriage 223 has reached a starting position of the reading operation (hereinafter also referred to as "home position"). The home position sensor is constituted by, for example, a transmissive optical sensor. The position of the reading carriage 223 is controlled by the scanner-side controller 210 using the home position as the reference. For example, the position of the reading carriage 223, after being detected by the home position sensor, is controlled based on the number of pulses applied to the pulse motor 236 and the movement amount of the reading carriage 223 corresponding to one pulse.

With the scanner 200 configured as described above, the light from the exposure lamp 224 is emitted to the surface to be read of the original, and the reflected light is guided to the CCD image sensor 228 through the mirrors 226 and the lens 225. Also, the reading carriage 223 is moved along the original table glass 221 (in other words, the surface to be read of the original). Then, by obtaining the voltage outputted from the CCD image sensor 228 at a predetermined cycle, the density is read for a portion of the original that corresponds to the distance by which the reading carriage 223 has moved during that one cycle.

Regarding the Printer 100

<Regarding the Configuration>

Figure 8:
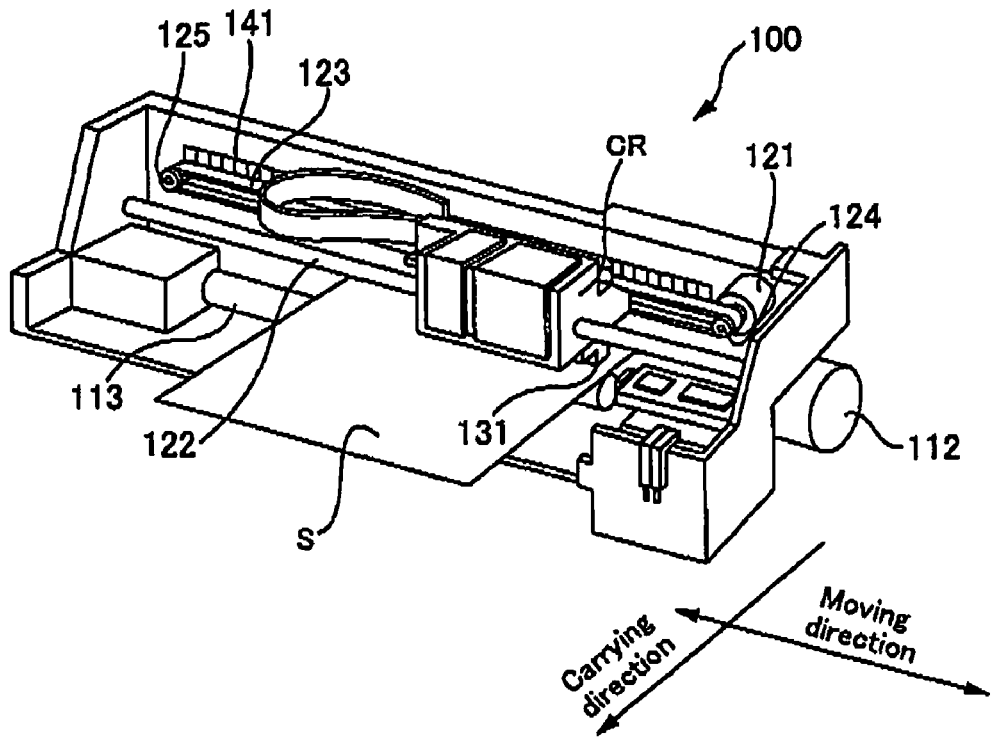
FIG. 8 is a perspective view explaining the internal configuration of a printer.
Figure 9:
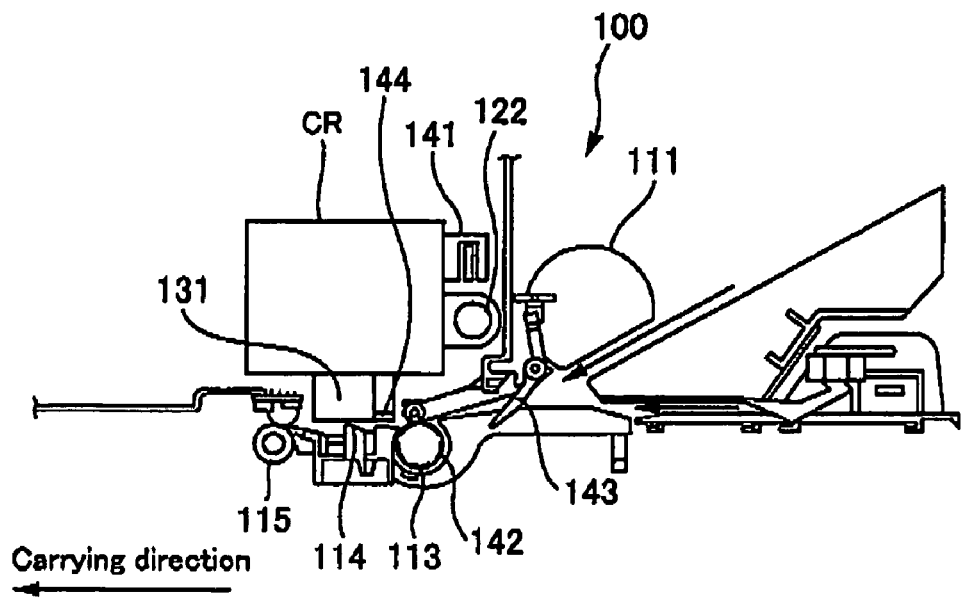
FIG. 9 is a side view explaining the internal configuration of the printer.
Figure 10:
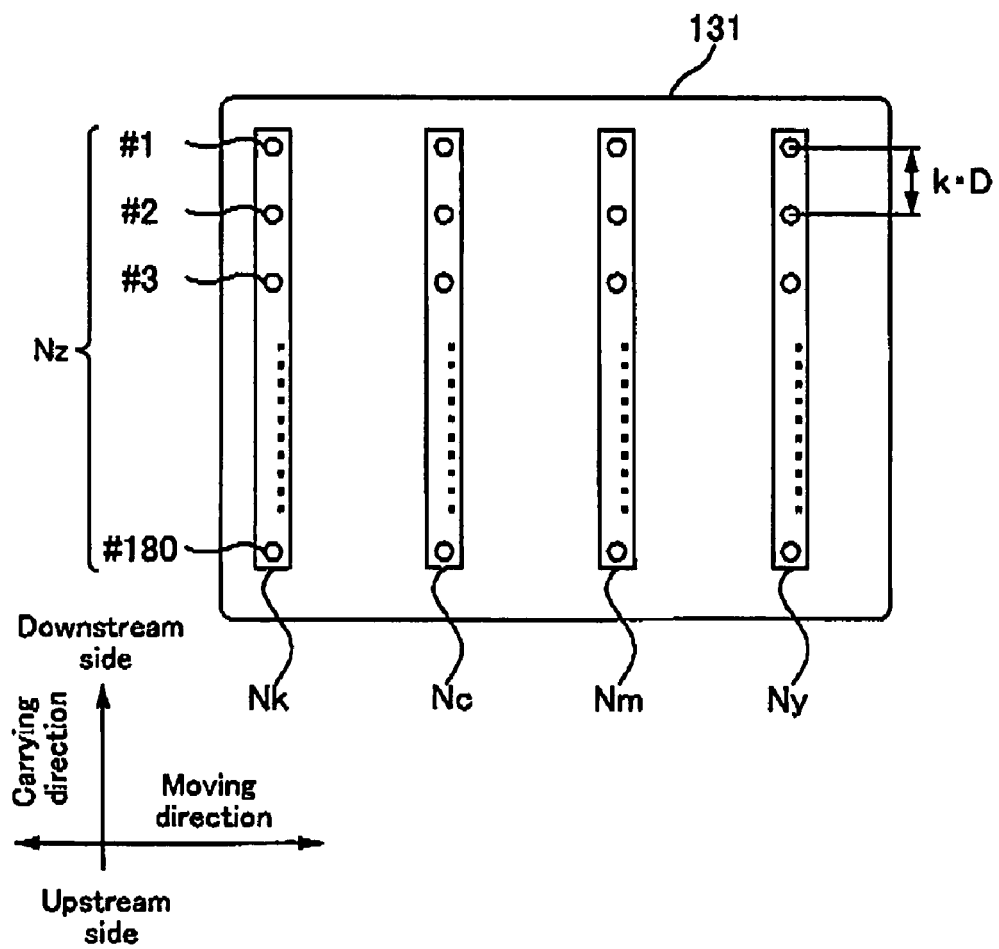
FIG. 10 is a diagram explaining the arrangement of nozzles in a head.
Figure 11:
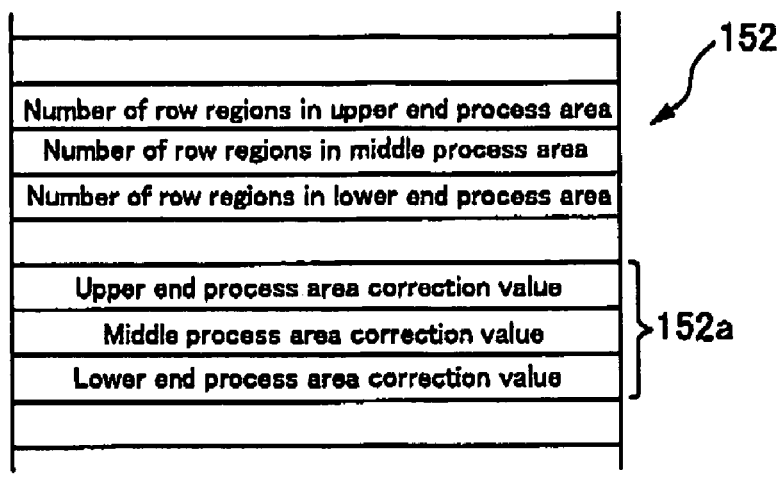
FIG. 11 is a diagram explaining areas in a memory of a printer-side controller.

Next, the printer 100 is described. FIG. 8 is a perspective view explaining the internal configuration of the printer 100. FIG. 9 is a side view explaining the internal configuration of the printer 100. FIG. 10 is a diagram explaining the arrangement of nozzles Nz in a head 131. FIG. 11 is a diagram for explaining a part of the area of the memory 152 of the printer-side controller 150. FIG. 2 is referred to as well in the following description.

As described above, the printer 100 corresponds to a printing apparatus that prints images on media such as paper S, cloths, films or OHP sheets. As shown in FIG. 2, the printer 100 includes a paper carrying mechanism 110, a carriage moving mechanism 120, a head unit 130, a detector group 140, and the printer-side controller 150. The printer 100, upon receiving print data from the computer 300, which is an external device, controls control target sections, namely, the paper carrying mechanism 110, the carriage moving mechanism 120 and the head unit 130 by the printer-side controller 150. At this time, each detector of the detector group 140 monitors the conditions in the printer 100. Each of the detectors output detection results to the printer-side controller 150. The printer-side controller 150 that has received the detection results from the detectors controls the control target sections based on the detection results.

As shown in FIGS. 8 and 9, the paper carrying mechanism 110 sends the paper S to a printable position, or carries the paper S by a predetermined carrying amount in a carrying direction. Here, the carrying direction is a direction that intersects the carriage movement direction described next. The paper carrying mechanism 110 includes a paper supplying roller 111, a carrying motor 112, a carrying roller 113, a platen 114 and a paper-discharge roller 115. The paper supplying roller 111 is a roller for automatically sending the paper S that has been inserted into a paper insert opening into the printer 100, and in this example has a D-shaped cross-sectional shape. The carrying motor 112 is a motor for carrying the paper S in the carrying direction, and is constituted by, for example, a DC motor. The operation of the carrying motor 112 is controlled by the printer-side controller 150. The carrying roller 113 is a roller for carrying the paper S that has been supplied by the paper supplying roller 111 to a printable region. The operation of the carry roller 113 also is controlled by the carrying motor 112. The platen 114 is a member that supports the paper S on which printing is being performed from the rear surface of the paper S. The paper-discharge roller 115 is a roller for carrying the paper S for which printing has finished.

The carriage movement mechanism 120 is a mechanism for moving the carriage CR to which the head unit 130 is attached in a movement direction. The movement direction includes a direction from one end to the other end, and also a direction from that other end to the one end. The head unit 130 includes the head 131 that serves as a print head, and nozzles Nz (see FIG. 10) for ejecting ink. Thus, when the carriage CR moves, the head 131 and the nozzles Nz also move in the movement direction of the carriage CR. That is, the movement direction of the carriage CR corresponds to the movement direction of the head 131 as well as the movement direction of the nozzles Nz. Hereinafter, the movement direction of the carriage CR, the head 131 and the nozzles Nz is also referred to simply as the movement direction.

The carriage movement mechanism 120 includes a carriage motor 121, a guide shaft 122, a timing belt 123, a drive pulley 124, and an idler pulley 125. The carriage motor 121 corresponds to a driving source for moving the carriage CR. The operation of the carriage motor 121 is also controlled by the printer-side controller 150. The drive pulley 124 is attached to a rotation shaft of the carriage motor 121. The drive pulley 124 is disposed on one end side of the movement direction. The idler pulley 125 is disposed on the other end side of the movement direction that is the side opposite to the drive pulley 124. The timing belt 123 is a circular member affixed to the carriage CR at its one end portion, extended between the drive pulley 124 and the idler pulley 125. The guide shaft 122 is a rod-like member that supports the carriage CR in a state allowing movement thereof. The guide shaft 122 is attached along the movement direction. Therefore, when the carriage motor 121 operates, the carriage CR moves in the movement direction along the guide shaft 122.

The head unit 130 is for causing ink to be ejected onto the paper S, and includes the head 131. As shown in FIG. 10, the nozzles Nz for ejecting ink are provided on the lower surface of the head 131. These nozzles Nz are divided into groups according to each of the ink types to be ejected, with each group constituting a nozzle row. The head 131 illustratively shown in the drawing has a black ink nozzle row Nk, a cyan ink nozzle row Nc, a magenta ink nozzle row Nm, and a yellow ink nozzle row Ny. Each nozzle row has n (n=180, for example) nozzles. The plurality of nozzles of each of the nozzle rows are arranged at a constant spacing (nozzle pitch; k·D) in the carrying direction. Here, D is the minimum dot pitch in the carrying direction, that is, the spacing of the dots formed on the paper S at the highest resolution. Moreover, k is a coefficient indicating the relationship between the minimum dot pitch D and the nozzle pitch, and is set to an integer of 1 or more. For example, if the nozzle pitch is 180 dpi (1/180 inch) and the dot pitch in the carrying direction is 720 dpi (1/720 inch), then k=4. In the example of the drawing, the nozzles Nz of each nozzle row are assigned a number that decreases the closer it is to the downstream side in the carrying direction (#1 to #180). That is, the nozzle Nz (#1) is located more downstream in the carrying direction, that is, more toward the front end side of the paper S, than the nozzle Nz(#180).

With the printer 100, a plurality of types of ink of differing amounts can be ejected individually from each of the nozzles Nz. For example, it is possible to eject three types of ink droplets for the above-described pixel, these being a large ink droplet in an amount that allows the formation of a large dot, a medium ink droplet in an amount that allows the formation of a medium dot, and a small ink droplet in an amount that allows the formation of a small dot. Thus, in this example, it is possible to perform four types of control, these being no dot formation corresponding to the pixel data "00", formation of a small dot corresponding to the pixel data "01", formation of a medium dot corresponding to the pixel data "10", and formation of a large dot corresponding to the pixel data "11". That is, it is possible to achieve recording in four gradations.

The detector group 140 is for monitoring the conditions in the printer 100. The detector group 140 includes a linear encoder 141, a rotary encoder 142, a paper detector 143, and a paper width detector 144, for example. The linear encoder 141 is for detecting the position in the movement direction of the carriage CR. The rotary encoder 142 is for detecting the amount of rotation of the carrying roller 113. The paper detector 143 is for detecting the position of the front end of the paper S to be printed. The paper width detector 144 is for detecting the width of the paper S to be printed.

The printer-side controller 150 performs control of the printer 100. The printer-side controller 150 has a CPU 151, a memory 152, a controlling unit 153, and an interface section 154. The CPU 151 is a computation processing device for performing the overall control of the printer. The memory 152 is for reserving an area for storing programs for the CPU 151 and a working area, for example, and is constituted by a storage element such as a RAM, an EEPROM, or a ROM. The CPU 151 controls each of the control target sections via the controlling unit 153 in accordance with the programs stored in the memory 152. In this example, as shown in FIG. 11, various types of information is stored in a part of the area in the memory 152. For example, the number of row regions (described later) and correction values for each process area are stored. The interface section 154 is interposed between the computer 300, which is an external device, and the printer 100, and is for sending and receiving data between the two.

<Regarding the Printing Operation>

Figure 12:
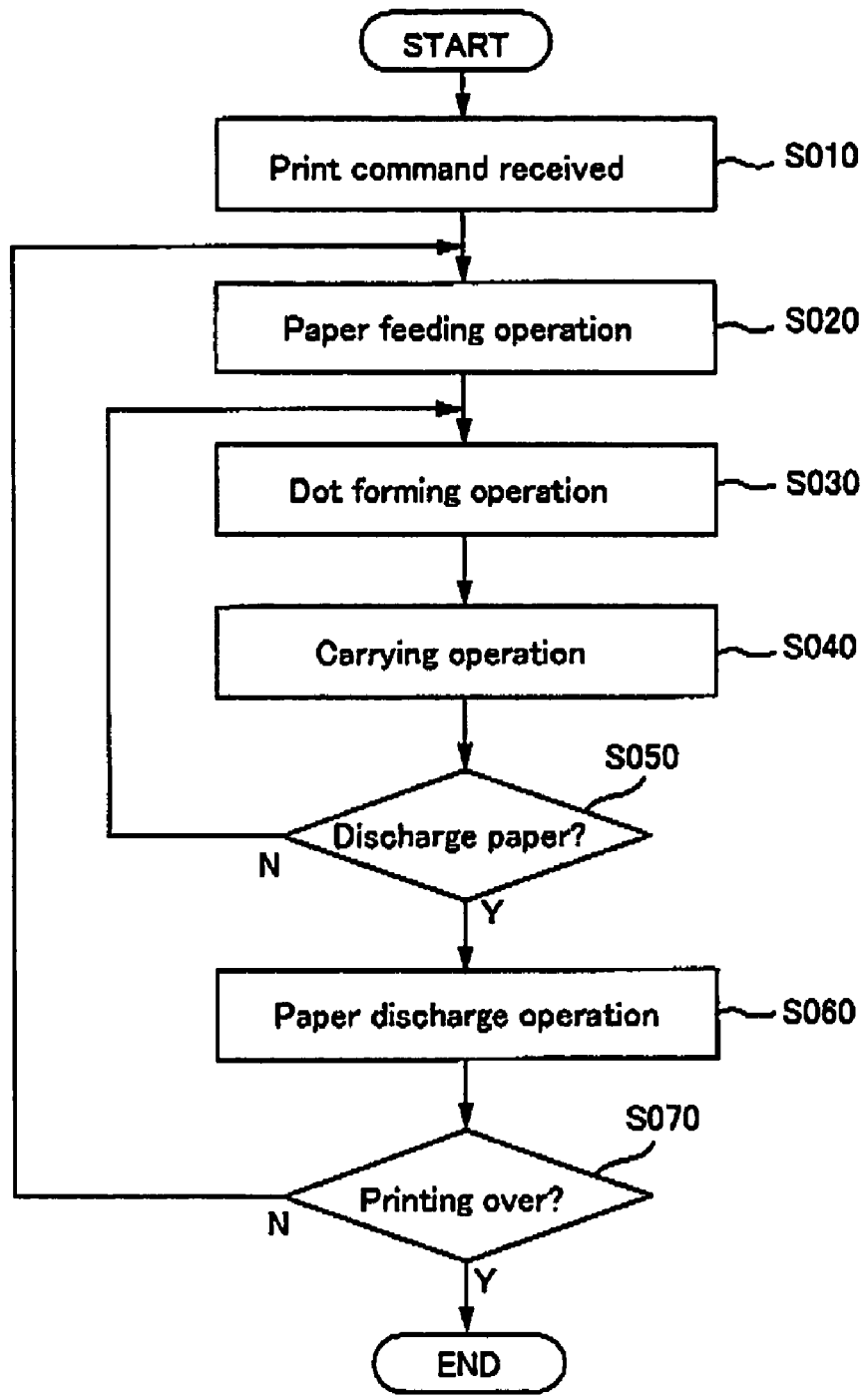
FIG. 12 is a flow chart explaining processes during printing.

FIG. 12 is a flow chart describing processes during printing. Each of the processes described below are executed by the printer-side controller 150 controlling the control target sections in accordance with computer programs stored in the memory 152. Therefore, the computer programs contain codes to carry out each of the processes.

The printer-side controller 150, upon receiving a print command in print data (S010), carries out in this order a paper supplying operation (S020), a dot forming operation (S030), a carrying operation (S040), a paper discharge determination (S050), a paper discharge operation (S060), and print over determination (S070). The paper supplying operation is an operation for sending the paper S to be printed to be positioned at a print start position (also referred to as the "indexing position"). The dot forming operation is an operation for forming dots on the paper S. In this dot forming operation, the printer-side controller 150 drives the carriage motor 121, or outputs control signals to the head 131. The carrying operation is an operation for moving the paper S in the carrying direction. By this carrying operation, dots can be formed at positions that are different from those dots formed in the previous dot forming operation. The paper discharge determination is an operation to determine whether or not to discharge the paper S that is being printed. The discharge operation is a process to cause the paper S to be discharged, which is carried out on the condition that the determination made in the preceding paper discharge determination is "to discharge". The print over determination is a determination of whether or not to continue printing.

Here, an image is printed by repeating the dot forming operation (S030) and the carrying operation (S040) in alternation. In the dot forming operation, ink is intermittently ejected from the head 131 (nozzles Nz) that is moving in the carrying direction. Specifically, the printer-side controller 150 causes ink to be ejected from the head 131 based on the pixel data contained in the print data, while the carriage CR is moved by driving the carriage motor 121. Then, when the ink ejected from the head 131 lands on the surface of paper, dots are formed on the paper. Moreover, since the ink is intermittently ejected while the head 131 is moving, a plurality of the dots are formed on the paper lined up in the movement direction. In other words, a row of dots composed of a plurality of dots lined up in the movement direction (hereinafter also referred to as "raster line") is formed on the paper. The dot forming operation and the carrying operation are repeated in alternation, and therefore, a plurality of raster lines are formed adjacent to one another in the carrying direction. Consequently, it can be said that the image printed on the paper S is constituted by a plurality of raster lines adjacent to one another in the carrying direction.

Since the printer 100 is configured so that the head 131 that ejects ink is moved in the movement direction and the paper S is carried in the carrying direction, it is possible to print high-quality images with a simpler configuration compared with other color printing apparatuses.

Regarding Printing Method

<Regarding Interlace Printing>

As described above, the printer 100 prints images by intermittently ejecting ink from the nozzles Nz while moving the head 131 in the movement direction. Incidentally, the aforementioned head 131 has a very fine form. Therefore, each section of the nozzles Nz, etc. is subject to certain variance caused when processing or assembling the same. Due to this variance, the characteristics such as flight path or ejection amount (hereinafter also referred to as "ejection characteristics") of ink also varies. In order to lessen the variance of the ejection characteristics, printing by the interlace mode (hereinafter referred to as "interlace printing") is performed. The interlace printing refers to printing in which raster lines that are not recorded are sandwiched between raster lines that are recorded in a single pass. It should be noted that "pass" means a single dot forming operation, and "pass n" means the "n"th dot forming operation.

Figure 13:
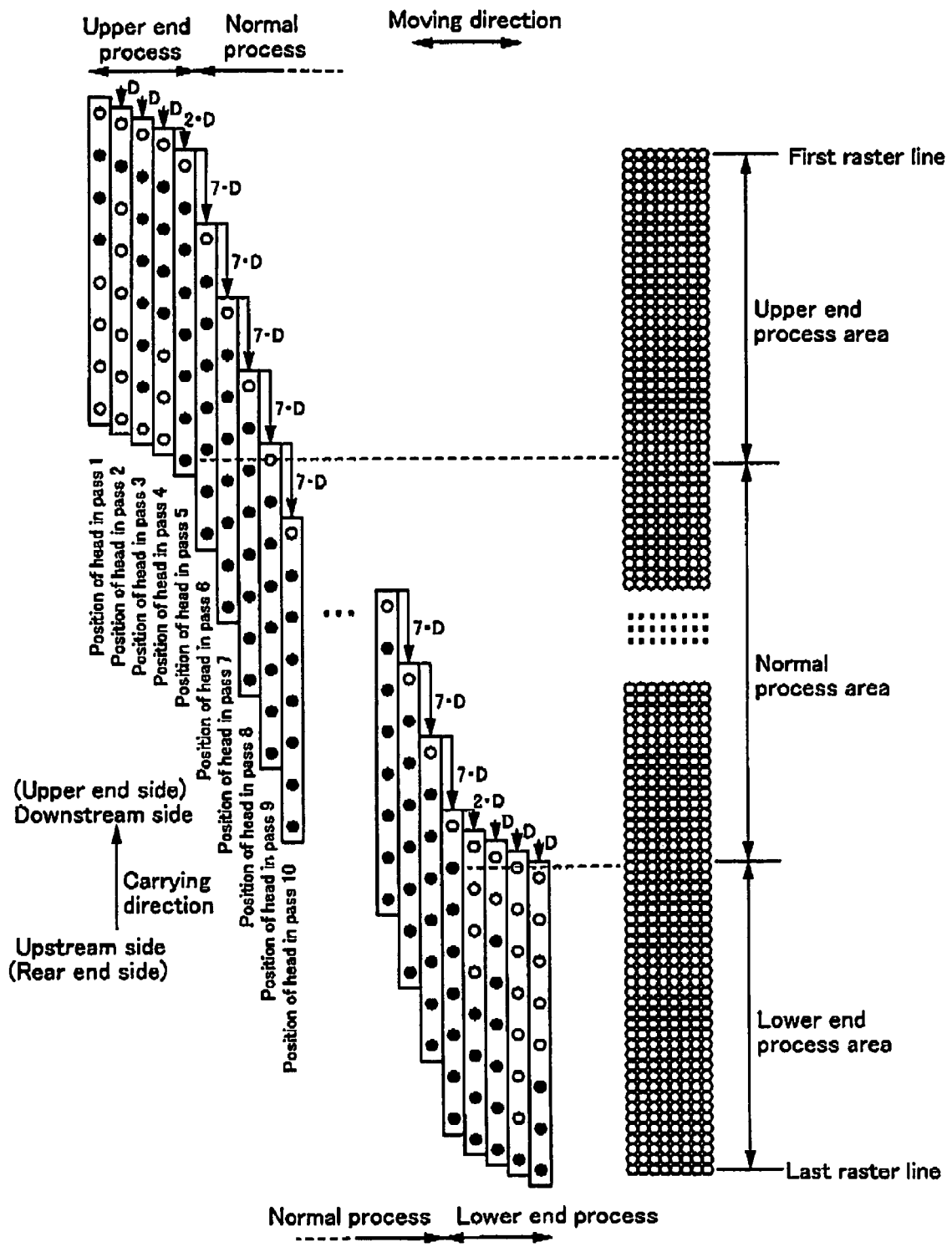
FIG. 13 is a diagram explaining an example of interlace printing.

FIG. 13 is a diagram explaining an example of the interlace printing. In this example, there are three process areas including an upper end process area, a normal process area, and a lower end process area. The normal process area is an area in which raster lines are formed only by a normal process, which is a standard process. The upper end process area is an area allocated in the front end side of the paper S from the normal process area, in which raster lines are formed by an upper end process and the normal process. In this upper end process, nozzles Nz that eject ink and the carrying amount are determined so as to form raster lines that cannot be formed by the normal process. The lower end process area is an area allocated in the rear end side of the paper S from the normal process area, in which raster lines are formed by the normal process and a lower end process. In the lower end process as well, nozzles Nz that eject ink and the carrying amount are determined so as to form raster lines that cannot be formed by the normal process. Accordingly, the normal process area can be also referred to as a middle area sandwiched by the upper end process area and the lower end process area. Therefore, the normal process area corresponds to the middle process area, and the normal process corresponds to a middle process.

In the example shown in FIG. 13, for the convenience of explanation, only one of a plurality of nozzle rows of the head 131 is shown, and the number of nozzles Nz of one nozzle row is reduced. Moreover, in this example, the head 131 (or nozzle row) is illustrated as moving with respect to the paper S, but the drawing shows the relative position of the head 131 and the paper S. Therefore in the actual printer 100, the paper S moves in the carrying direction. A large number of dots are formed lined up in the carrying direction by the ink intermittently ejected from each of the nozzles Nz. It should be noted that there is a case in which no dot is formed according to pixel data. In addition, nozzles Nz shown by solid circles are nozzles that can eject ink. On the other hand, nozzles Nz shown by empty circles are nozzles that do not eject ink.

In the illustrated process, the first five passes constitute the upper end process, and the last five passes constitute the lower end process. Passes between the first five passes and the last five passes constitute the normal process. In the normal process, every time the paper S is carried in the carrying direction by a constant carrying amount F, each of the nozzles Nz record a raster line just above the raster line that was recorded in the immediately preceding pass. In order to carry out recording in this manner with a constant carrying amount, it is necessary to satisfy the following conditions, that is, (1) the number N (integer) of nozzles Nz that can eject ink is coprime to the coefficient k, and (2) the carrying amount F is set to N·D (D is a spacing in the carrying direction at the maximum resolution). In this case, N=7, k=4 and F=7·D are set so as to satisfy these conditions (D=720 dip). With respect to a raster line group formed by the normal process, combination of the nozzles Nz used to form each raster line has a periodicity. That is to say, raster lines formed by the same combination of the nozzles Nz appear every certain predetermined number of raster lines.

On the other hand, in the upper end process, the paper S is carried at a carrying amount (1·D or 2·D) that is smaller than that in the normal process (7·D). In the upper end process, the nozzles Nz that eject ink are not fixed. In the lower end process as well, as in the upper end process, the paper S is carried at a carrying amount (1·D or 2·D) that is smaller than that in the normal process (7·D). It should be noted that it is difficult to find certain regularity in the combination of the nozzles Nz in the upper end process and the lower end process.

Regarding Correction Values

As described above, the printer 100 prints images by repeating the dot formation operation and the carrying operation in alternation, and further by performing the interlace printing, mitigates variance in the ejection characteristics of the nozzles Nz, thus improving quality of images. However, recent demand for higher image quality is high so that further improvement of image quality is demanded for images obtained by the interlace printing. In order to meet such a demand, it is conceived to set correction values for each row region where a raster line is formed, thus correcting density of raster lines for each row region. Here, "row region" refers to a region constituted by a plurality of unit regions arranged in the movement direction. For example, if the print resolution is 720 dpi×720 dpi, the row region is a band-like region with a width in the carrying direction of 35.28 μm (≈1/720 inch) When ink is intermittently ejected from the nozzles Nz that are moving in the movement direction in an ideal manner, a raster line is formed in the row region. Since an image is constituted by a plurality of raster lines adjacent to one another in the carrying direction, the row region is also defined in a plural number in the carrying direction of the paper S (direction intersecting the movement direction.)

<Regarding Density Non-Uniformity (Banding)>

Figure 14A:
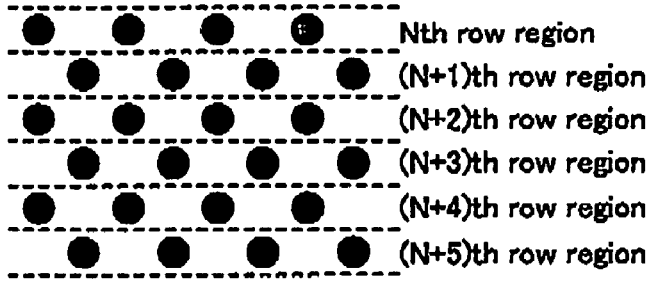
FIG. 14A is a diagram explaining a dot group formed with ideal ejection characteristics.
Figure 14B:
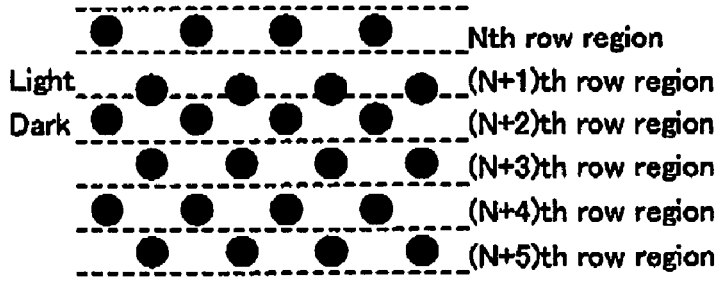
FIG. 14B is a diagram explaining effects of variance in the ejection characteristics.
Figure 15:
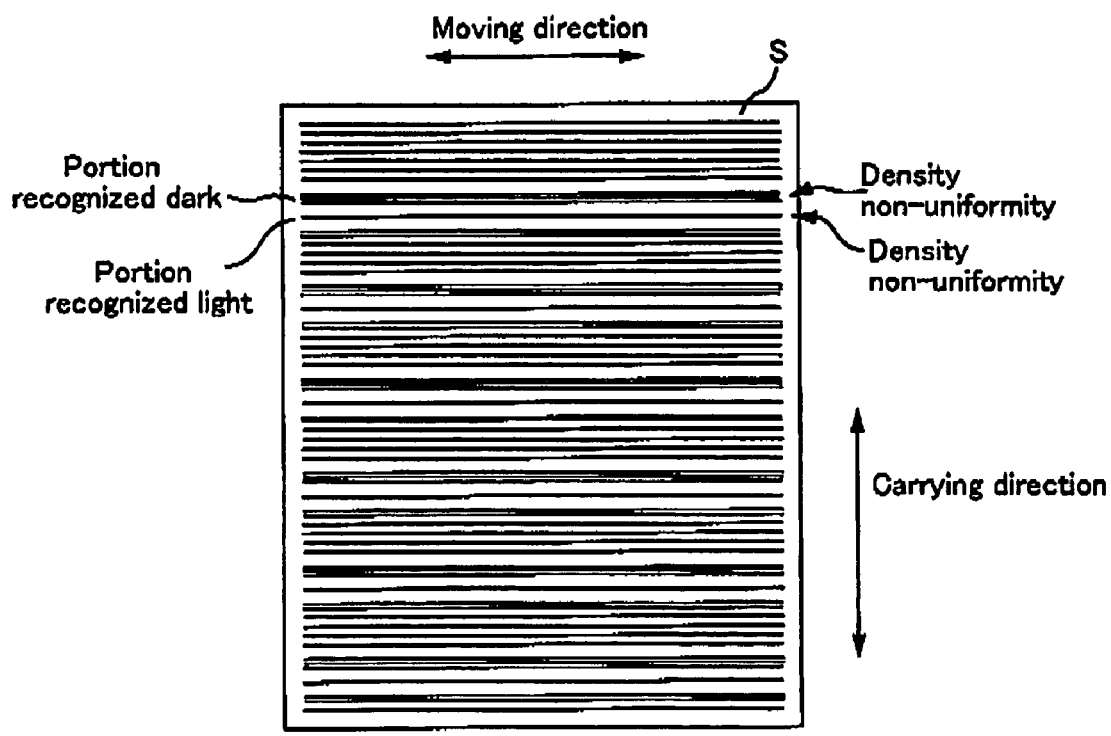
FIG. 15 is a conceptual diagram for explaining density non-uniformity.

Before describing the correction value, density non-uniformity (variance in density) is described. The density non-uniformity can be recognized as parallel bands (for convenience, also referred to as lateral bands) with respect to the movement direction of the carriage CR. In other words, non-uniformity of density occurs in the carrying direction of the paper S. FIG. 14A is a diagram explaining a dot group formed with the ideal ejection characteristics. FIG. 14B is a diagram explaining effects of variance in the ejection characteristics. FIG. 15 is a conceptual diagram for explaining density non-uniformity. For the sake of convenience, an image printed in a single color is used as an example in the following description. Note that the density of the image constantly is halftone (50% density, for example) in FIGS. 14A and 14B.

In the example shown in FIG. 14, since the ejection characteristics are ideal, ink ejected from the nozzles Nz lands on the unit region virtually defined on the paper with high position accuracy. Specifically, the center of the unit region and that of the dot coincide. A raster line is constituted by a plurality of dots lined up in the movement direction. Therefore, it can be said that the raster line is formed in the middle in the carrying direction of the row region with high position accuracy. In this example, when the image density of the printed image is compared using the row region as a unit, the image density of each row region is consistent. For the sake of convenience, in the following description, each image divided by the row regions is also referred to as image piece. Here, the raster line and the image piece are different in that the image piece is obtained by dividing the printed image by the row region, whereas the raster line is a row of dots formed by ink landing on a medium.

In the example of FIG. 14B, due to variance in the ejection characteristics, the raster line corresponding to the (n+1)th row region is formed shifted from its normal position to the side of the (n+2)th row region (lower side in FIG. 14B). Normally, the density of each image piece should be consistent as in the example in FIG. 14A. However in the example of FIG. 14B, the density of each image piece varies due to variance in the ejection characteristics. For example, the density of the image piece corresponding to the (n+1)th row region is lower than the density of the image piece corresponding to the standard row region (the nth or (n+3)th row region, for example). In addition, the density of the image piece corresponding to the (n+2) th row region is higher than the density of the image piece corresponding to the standard row region.

As shown in FIG. 15, variance in the density of image pieces is recognized as density non-uniformity in the form of lateral bands, as seen macroscopically. In other words, the adjacent raster lines with a relatively wide spacing between them macroscopically appear lighter; whereas raster lines with a relatively narrow spacing between them macroscopically appear darker. This density non-uniformity causes deterioration of image quality of printed images.

It should be noted that the cause of this density non-uniformity also applies to the other ink colors as well. If the variance in the ejection characteristics is present in even one of the colors of C, M, Y and K, the density non-uniformity occurs to the image printed by the multi-color printing.

<Overview of the Correction Values>

In order to correct the density non-uniformity in each of the row regions, the printer 100 of the present embodiment stores correction values for each of the row regions For example, for a row region that tends to be recognized as darker than the standard, correction values set so as to form an image piece of that row region lighter are stored. In contrast, for a row region that tends to be recognized as lighter than the standard, correction values set so as to form an image piece of that row region darker are stored. These correction values are referenced in the process by the printer driver 330, for example. For example, the CPU 311 of the computer 300 corrects CMYK pixel data obtained through the color conversion process based on the correction values. The corrected CMYK pixel data is subjected to the halftoning process. In short, gradation values of pixel data are corrected based on the correction values. In this way, ejection amount of ink is adjusted to suppress inconsistency in density of the image pieces.

It should be noted that in the example in FIG. 14B, the image piece corresponding to the (n+2)th row region becomes darker because the spacing between relevant adjacent raster lines is narrower than the normal spacing. More specifically, the (n+1)th raster line that should be originally formed in the middle in the carrying direction of the (n+1)th row region is shifted too much to the side of the (n+2)th row region, and therefore the corresponding image piece becomes darker. In other words, the density of the (n+2)th row region is not caused by the raster line corresponding to the (n+2)th row region. For this reason, when the density non-uniformity is considered based on the image piece, it is necessary to consider raster lines formed in adjacent row regions as well. Therefore, it is impossible to suppress the density non-uniformity by a method in which correction values are set merely for each nozzle. Accordingly, in the present embodiment, a correction value is set for each row region, and the density of the printed image is corrected based on the correction value. In this way, images with further higher quality can be printed.

In order to set the correction values, in the present embodiment, the printer 100 is caused to print a test pattern at the inspection process at a printer manufacturing factory, the density of the test pattern is read by the scanner 200, and correction values for each row region are set based on the read density of the density corresponding to each of the image pieces in the test pattern. In other words, correction values are set based on measured values of the density measured by the scanner 200. The correction values for each of the row regions are stored in the correction value storage section 152a in the memory 152 of the printer-side controller 150. Here, note that the test pattern is a pattern printed by the printer 100 in which the correction values are stored. Consequently, correction values that are set reflect the density non-uniformity characteristics in the individual printer 100. On the side of the user who has purchased the printer 100, the computer (a computer possessed by the user) obtains the correction values and corrects gradation values of the pixel data based on the obtained correction values. In addition, the computer generates print data based on the corrected gradation values and outputs it to the printer 100. Then, the printer 100 performs printing based on the print data.

Regarding Processes at the Printer Manufacturing Factories

<Printing of Test Patterns>

Figure 16A:
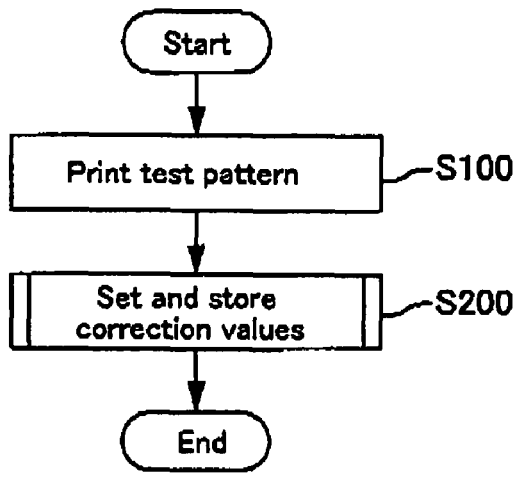
FIG. 16A is a flow chart of a correction value setting process that is carried out at inspection process of the printer after it is manufactured.
Figure 16B:
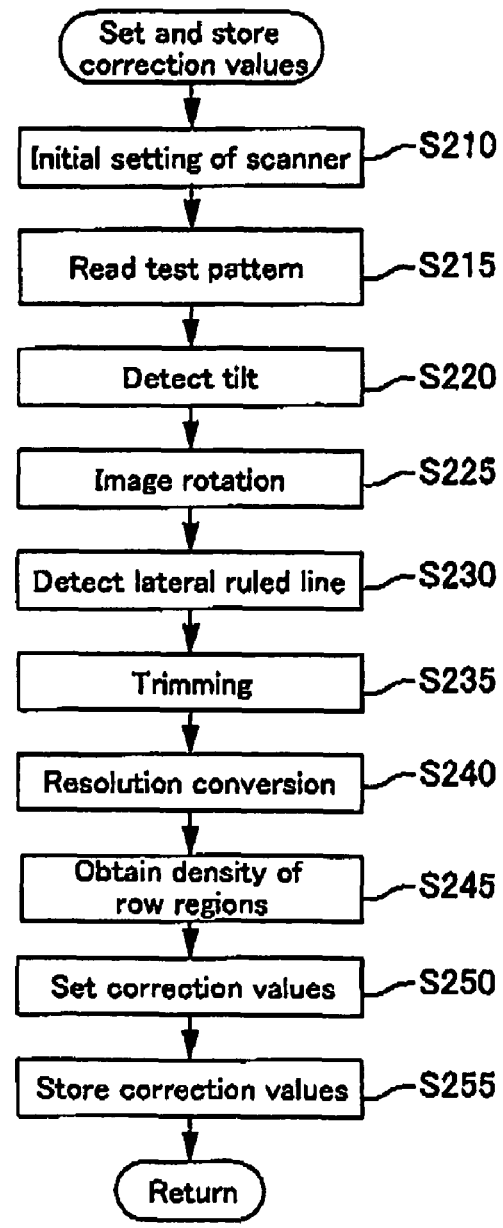
FIG. 16B is a flow chart of steps taken for setting and storing a correction value in the correction value setting process.

Next, processes performed at the printer manufacturing factory are explained. FIG. 16A is a flow chart of the correction value setting process that is performed in the inspection process of the printer 100 after it is manufactured. FIG. 16B is a flow chart of steps taken for setting and storing correction values in the correction value setting process. It should be noted that the correction value setting process described below is realized by a correction value setting program 320' that is installed on the computer 300, a scanner driver 350, and the printer driver 330. Accordingly, these correction value setting program 320', the scanner driver 350 and the printer driver 330 include a code for carrying out the correction value setting process.

Prior to the correction value setting process, an operator connects the printer 100 in which correction values are stored to the computer 300. The scanner 200 is connected to the computer 300 in advance. In addition, the correction value setting program 320' is installed on the computer 300. The correction value setting program 320' is, as described above, one type of the application programs 320. The correction value setting program 320' causes the CPU 311 to carry out the setting process of correction value and other relevant processes. Such processes includes, for example, a process for causing the printer 100 to print a test pattern, a process for subjecting the density data of the image obtained from the scanner 200 to image processing or analyzing, etc., and a process for storing set correction values on the memory 152 (correction value storage section 152a) of the printer 100.

After the printer 100 is connected to the computer 300, a test pattern is printed (S100). In this step, the operator of the factory provides an instruction to cause the printer 100 to print the test pattern via a user interface of the correction value setting program 320'. Upon receiving this instruction, the CPU 311 of the host-side controller 310 generates print data for the test pattern and thereafter transmits the generated print data to the printer 100. The printer 100 prints the test pattern on the paper S as a medium based on the print data from the computer 300. This print operation is carried out in accordance with the processes described above (see FIG. 12). Described briefly, the print operation is carried out by repeating in alternation the dot forming operation (S030) for ejecting ink toward the paper S while moving the head 131 in the movement direction, and the carrying operation (S040) for carrying the paper S in the carrying direction, according to the print data.

<Regarding Test Patterns>

Figure 17A:
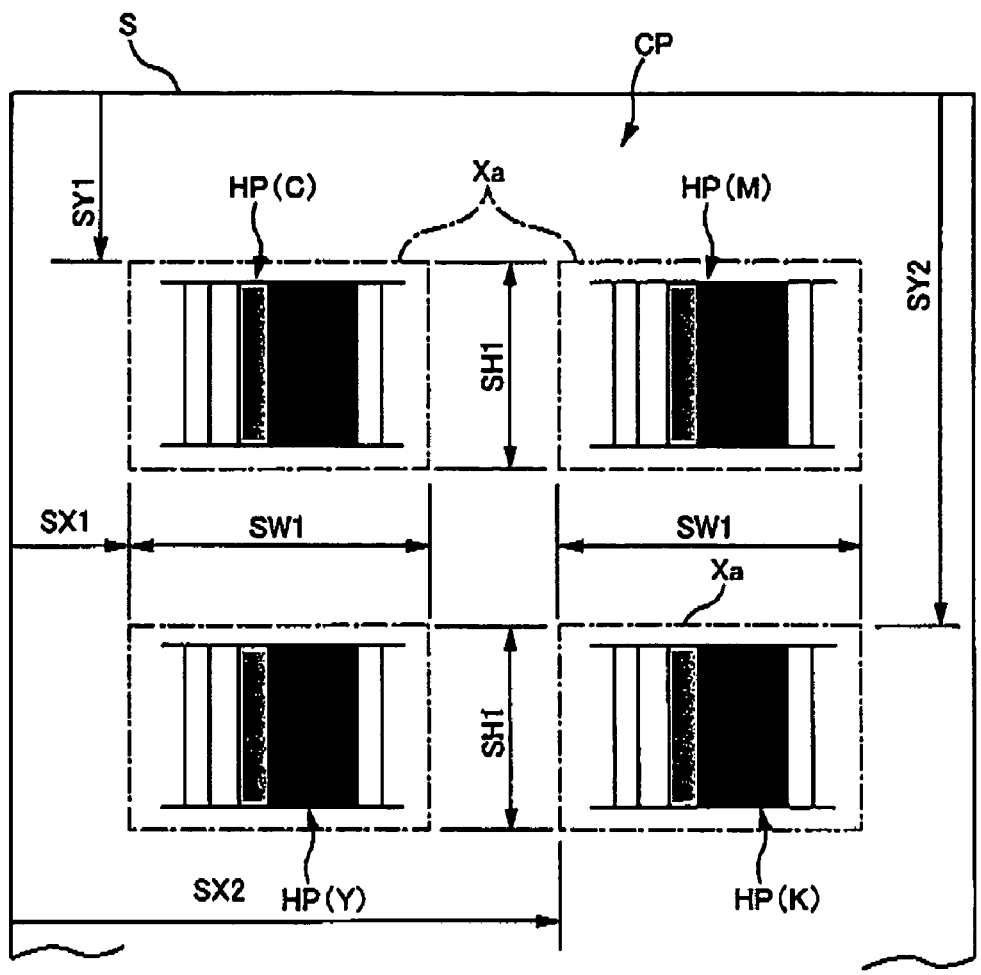
FIG. 17A is an explanatory diagram of a test pattern.
Figure 17B:
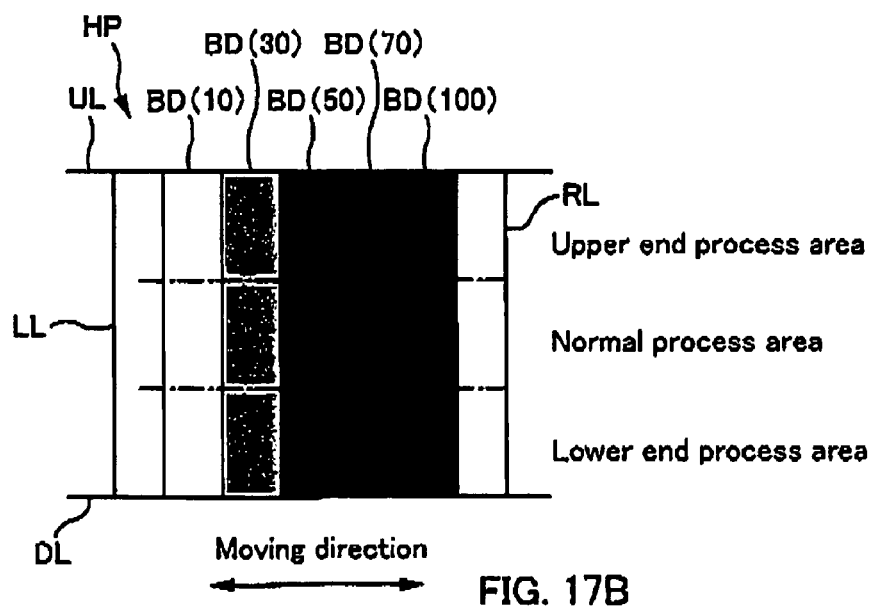
FIG. 17B is an explanatory diagram of a correction pattern.

The printed test pattern is described next. FIG. 17A is an explanatory diagram of the test pattern CP. FIG. 17B is an explanatory diagram of the correction pattern HP. Note that the test pattern CP refers to the entire correction patterns HP printed on the paper S. The correction pattern HP refers to a portion that is printed using the same type of ink, and that is used to evaluate non-uniformity in density. As described above, the printer 100 can eject four types of ink, namely, cyan ink (C), magenta ink (M), yellow ink (Y), and black ink (K). Therefore, it is possible to say that the test pattern CP has four correction patterns HP corresponding to the colors. Moreover, inks made of different color materials are treated as different types of ink. For example, dye black ink and pigment black ink are treated as different types of ink even if they are of the same color. Consequently, in case of the printer 100 that uses dye black ink and pigment black ink, a correction pattern HP is printed in dye black ink, and another correction pattern HP is printed in pigment black ink.

Each of correction patterns HP is constituted by band-like patterns BD (BD(10) to BD(100)) printed in different predetermined density, an upper ruled line UL, a lower ruled line DL, a left ruled line LL, and a right ruled line RL. The band-like patterns BD correspond to regions printed in different density, and has a band-like shape elongated in the carrying direction. The band-like pattern BD of the present embodiment is constituted by five types of patterns (BD(10) to BD(100)), each of which is printed based on the image data of a constant gradation value. As shown in FIG. 17B, these band-like patterns BD(10) to BD(100) are printed lined up in the movement direction. Specifically, from the left-end band pattern BD to the right side, these band patterns BD have a gradation value of 26 (10% density), a gradation value of 76 (30% density), a gradation value of 128 (50% density), a gradation value of 179 (70% density), and a gradation value of 255 (100% density). The print density becomes higher as closer it is to the right end. In addition, these bank-like patterns BD(10) to BD(100) are printed adjacent to one another.

These band-like patterns BD(10) to BD(100) are provided in each of the correction patterns HP. Therefore, the test pattern CP includes a plurality of groups consisting of a plurality of band-like patterns BD (a group of regions) each of which is printed at different predetermined density, for each type of ink. By using the test pattern CP as described above, it is possible to accomodate print conditions for each type of ink. As a result, precision of obtained correction values can be improved.

It should be noted that these five types of gradation values (density) correspond to the print command values in terms of control. Therefore, these gradation values (density) are referred to as "command gradation value (command density)", and respectively expressed as a code Sa (gradation value 26), a code Sb (gradation value 76), a code Sc (gradation value 128), a code Sd (gradation value 179), and a code Se (gradation value 255).

As described above, when an image is printed, the upper end process, the normal process and the lower end process are performed. Therefore, each correction pattern HP is also printed using the upper end process, the normal process and the lower end process. In other words, each correction pattern HP includes the upper end process area, the normal process area (corresponds to the middle process area), and the lower end process area. In image printing performed by the user, the number of raster lines that constitute the normal process area is, in case of A4 size for example, approximately several thousands. Since the combination of the nozzles Nz that are in charge of forming each of the raster lines in the normal process area has a periodicity, the length (length in the carrying direction) of the normal process area in each correction pattern HP is set so that raster lines corresponding to a plurality of cycles are included in each of the correction patterns HP, for example, a length corresponding to eight cycles.

With regard to the upper ruled line UL and the lower ruled line DL, in the correction pattern HP, the upper ruled line UL is formed by the first raster line in the band-like pattern BD, and the lower ruled line DL is formed by the last raster line in the band-like pattern BD.

Regarding Correction Value Setting Process

<Initial Settings of the Scanner 200>

After the test pattern CP is printed, a process for setting correction values and storing them in the printer 100 is carried out (S200). This process is described below. As shown in FIG. 16B, in this process, the initial setting of the scanner 200 is carried out first (S210). In the initial setting, settings of items such as reading resolution of the scanner 200, type of the original, type of the image, scanning mode, and save format of the read image are carried out. Of these items, the reading resolution of the scanner 200 is required to be higher than the print resolution. Preferably, the reading resolution is set to an integer multiple of the print resolution. In this embodiment, since the print resolution of the test pattern CP is 720 dpi, the reading resolution of the scanner 200 is set to 2880 dpi, four times the print resolution. The type of the original is set to the reflecting original, the image type is set to 8-bit gray scale, and the bitmap format is set as the save format.

<Reading of the Test Pattern CP>

After the initial setting of the scanner 200 is finished, the test pattern CP is read (S215). In this step, the operator places the original (paper S on which the test pattern is printed) on the scanner 200. Then, the instruction is provided to cause the scanner 200 to read the density of the test pattern CP via a user interface of the correction value setting program 320'. Upon receiving this instruction, the CPU 311 of the host-side controller 310, outputs a reading command (one type of control command) to cause the scanner 200 to read the density of the original to the scanner 200. Upon receiving the reading command, the scanner-side controller 210 controls the reading mechanism 220 and the drive mechanism 230 to obtain the density data of the entire paper. In this case, the test pattern CP is read by moving the reading carriage 223 in a predetermined direction (sub-scanning direction). That is, the density of the band-like pattern BD that is printed at a predetermined density is obtained along the longitudinal direction of the band-like pattern BD. Then, the scanner-side controller 210 outputs the obtained density data to the computer 300. It should be noted that the density data obtained as described above becomes data indicating the density for each pixel (in this case, region in the size determined by the reading resolution), and constitutes an image. For this reason, in the following description, data obtained by the scanner 200 is also referred to as image data. Also, the density data for each of the pixels that constitutes the image data is also referred to as pixel density data. The pixel density data is constituted by gradation values indicating density.

Upon receiving image data from the scanner 200, the host-side controller 310 obtains, from the received image data, image data corresponding to a predetermined scope Xa for each of the correction patterns HP. As indicated by the dashed line in FIG. 17A, the predetermined scope Xa is defined as a rectangular scope in a size that is slightly larger than the correction pattern HP. The host-side controller 310 obtains from the image data for the entire paper, image data for each of the correction patterns HP. For example, in case of the cyan correction pattern HP (C) located in the upper left in FIG. 17A, the predetermined scope Xa indicated by the dashed line, enclosing the correction pattern HP (C), becomes image data for the cyan correction pattern HP (for the sake of convenience, also referred to as "cyan pattern image data"; the same is applied to other colors as well). The predetermined scope Xa is specified by parameters SX1, SY1, SW1 and SH1 that are determined in advance. It should be noted that the parameter SX1 is x-coordinate data indicating the origin of the predetermined scope Xa, and the parameter SY1 is y-coordinate data indicating the origin of the predetermined scope Xa. The parameter SW1 is data indicating a width in the x-axis direction of the predetermined scope Xa, and the parameter SH1 is data indicating a width in the y-axis direction of the predetermined scope Xa. These parameters are stored in the correction value setting program 320', for example. In this way, the host-side controller 310 obtains image data (pixel density data) for the predetermined scope Xa specified by the parameters SX1, SY1, SW1 and SH1. For correction patterns HP for the other colors as well, image data is obtained in the same procedure by using as appropriate parameters SX2 and/or SY2 indicating the origin.

<Correction of the Inclination of the Correction Pattern HP>

Figure 18A:
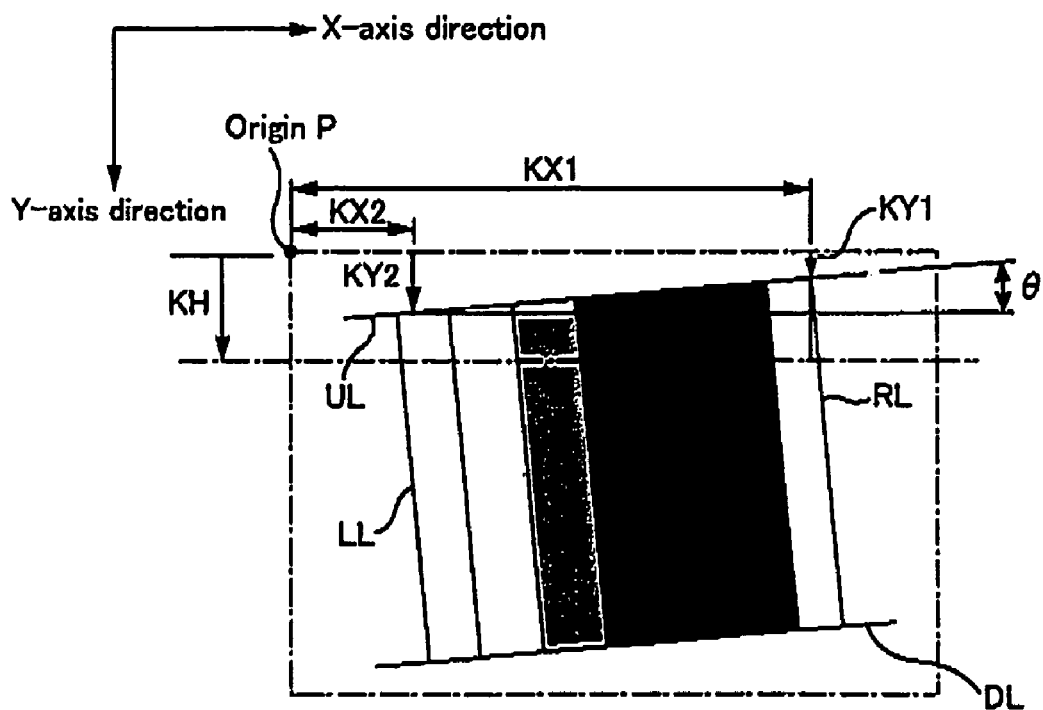
FIG. 18A is a diagram explaining image data when an inclination θ is detected.
Figure 18B:
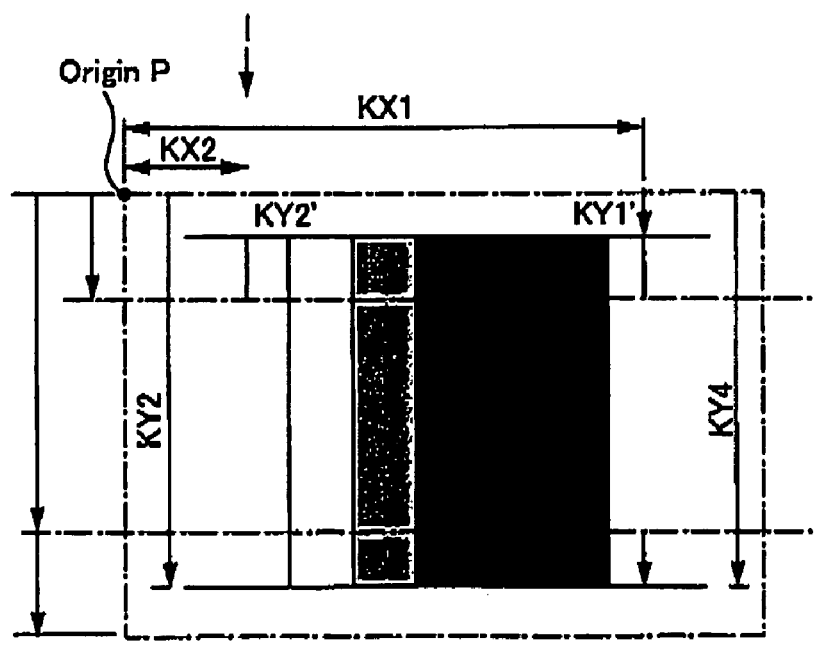
FIG. 18B is an explanatory diagram of the image data after a rotation process.

Next, the host-side controller. 310 detects an inclination θ of the correction pattern HP in image data (S220), and performs rotation process to the image data according to the inclination θ (S225). FIG. 18A is a diagram explaining the image data when detecting the inclination θ. FIG. 18B is an explanatory diagram of the image data after the rotation process. The host-side controller 310 obtains the pixel density data for pixels in the predetermined scope from the obtained image data. In this example, the image density data is obtained for a pixel group that is located separated from the origin P as the reference by a distance of KX1 in the x-axis direction, and that consists of KH pixels along the y-axis direction. Similarly, the image density data is obtained for a pixel group that is located separated from the origin by a distance of KX2 in the x-axis direction, and consisting of KH pixels along the y-axis direction. In this case, the parameters KX1, KX2 and KH are determined so that obtained pixels do not contain any pixel corresponding to the right ruled line RL and the left ruled line LL. At the same time, these parameters are determined so as to include pixels corresponding to the upper ruled line UL. Then, the host-side controller 310 obtains each of the gravity center positions KY1 and KY2 of the KH pieces of the pixel density data thus obtained (gradation value) in order to detect the position of the upper ruled line UL. Thereafter, the host-side controller 310 calculates the inclination θ of the correction pattern HP by the following expression (1) based on the parameters KX1 and KX2 and the gravity center positions KY1 and KY2, and performs rotation process of the image data based on the calculated inclination θ.

$$\theta = \tan^{-1}\{(KY2-KY1)/(KX2-KX1)\} \quad (1)$$

<Trimming of the Correction Pattern HP>

Figure 19:
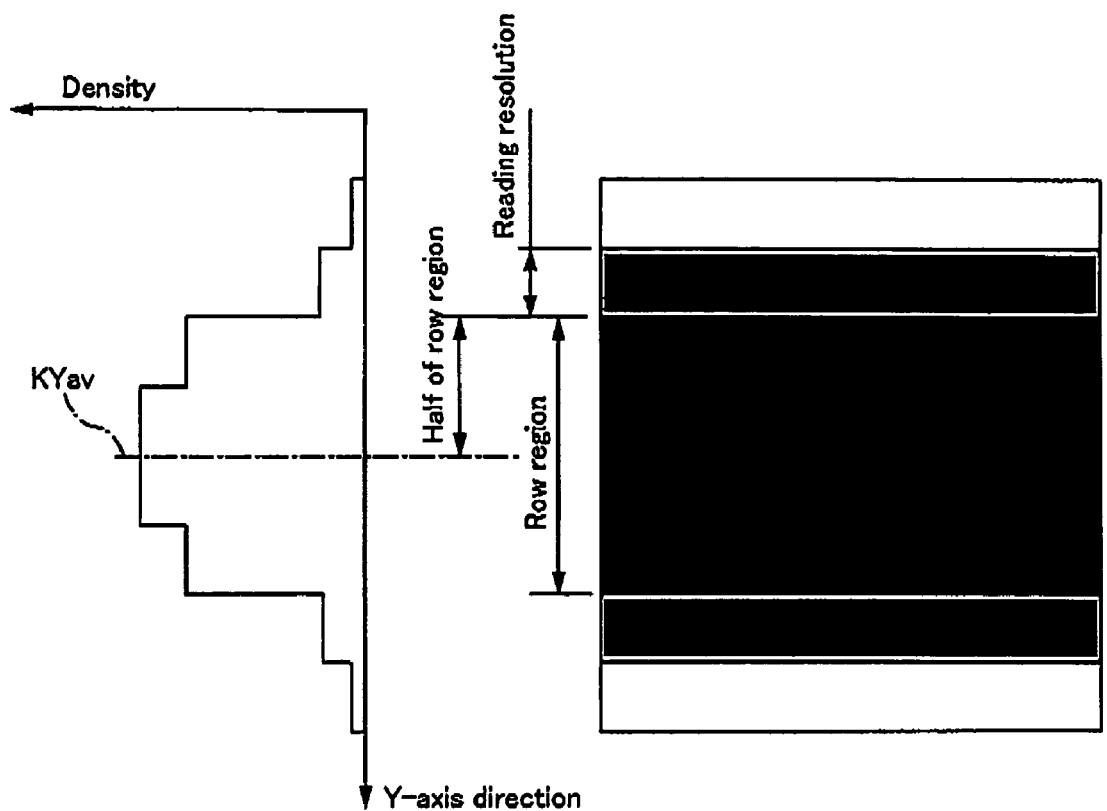
FIG. 19 is an explanatory diagram of image data during trimming.

The host-side controller 310 then detects lateral ruled lines (upper ruled line UL and lower ruled line DL) from the image data of each correction pattern HP (S230), and performs trimming (S235). FIG. 19 is an explanatory diagram of the image data when performing trimming, and is an explanatory diagram of the trimming position involving the upper ruled line UL. In this description, FIG. 18B is also referred to. The host-side controller 310 obtains the image density data for pixels in the predetermined scope from the image data that has been subjected to the rotation process. In this example, as in the preceding rotation process, the pixel density data is obtained for pixel groups that are located respectively separated from the origin as the reference by distances of KX1 and KX2 in the x-axis direction, and that consists of KH pixels along the y-axis direction. Next, the host-side controller 310 obtains the gravity center positions KY1' and KY2' (gravity center positions with respect to the density) of the KH pieces of the pixel data thus obtained for each of the two pixel groups. The average value of thus obtained two gravity center positions KY1' and KY2' is taken as the gravity center position KYav of the upper ruled line UL The host-side controller 310 sets as the trimming position the position that is shifted from the gravity center position KYav of the upper ruled line UL to the side of the origin by half the width of the row region. Specifically, the boundary between pixels closest to this position is determined as the trimming position. In this embodiment, the reading resolution when obtaining the image data is 2880 dpi, and the width of the row region when printing the test pattern CP is 720 dpi, and therefore a half of the width of the row region corresponds to the width of two pixels in the image data. Then, a correction value obtaining program cuts off pixels in the upper side than the determined trimming position, thus performing trimming. Although the above description is for the trimming position involving the upper ruled line UL, the similar process is performed for the lower ruled line DL, as well. That is, in trimming involving the lower ruled line DL, the position shifted from the gravity center position of the lower ruled line DL to the side distant from the origin by half the width of the row region is determined as the trimming position.

<Resolution Conversion>

After trimming, the host-side controller 310 converts the resolution of the image data that has been subjected to trimming (S240). In this process, the resolution of the image data is converted so that the number of pixels in the y-axis direction in the image data is equal to the number of raster lines constituting the correction pattern HP. Assuming that the correction pattern HP printed at a resolution of 720 dpi is read at a resolution of 2880 dpi, in this case, ideally, the number of pixels in the y-axis direction of the image data is four times the number of the raster lines constituting the correction pattern HP. However, actually, cases are possible in which the number of the raster lines does not match the number of pixels due to various effects such as error in printing or reading. Resolution conversion is carried out on the image data in order to solve such a mismatch.

In this process, the host-side controller 310 calculates a magnification for resolution conversion by applying the following expression (2) to the trimmed image data.

Magnification for resolution conversion=[the number of raster lines constituting the correction pattern HP]/[the number of pixels in the y-axis direction in the trimmed image data] (2)

When the magnification is calculated, resolution conversion process is performed using that magnification. While various methods can be used for the resolution conversion, a bi-cubic method is used in this example. As a result, the number of pixels lined up in the y-axis direction becomes equal to the number of row regions, and pixel rows lined up in the x-axis direction and row regions correspond to each other one by one. For example, the pixel row closest to the origin with respect to the y-axis direction corresponds to the first row region, and the next pixel row corresponds to the second row region. In other words, with respect to the correction pattern HP, the pixel density data is obtained for each unit region constituting row regions. Accordingly, it can be said that in the correction value setting system 1000, the density of the test pattern CP is read for each unit region. Since the density reading unit of the test pattern CP matches the unit region, association in evaluation of non-uniformity in density or correction value settings become easy, which improves working efficiency.

<Obtaining Density of Each Row Region>

Figure 20:
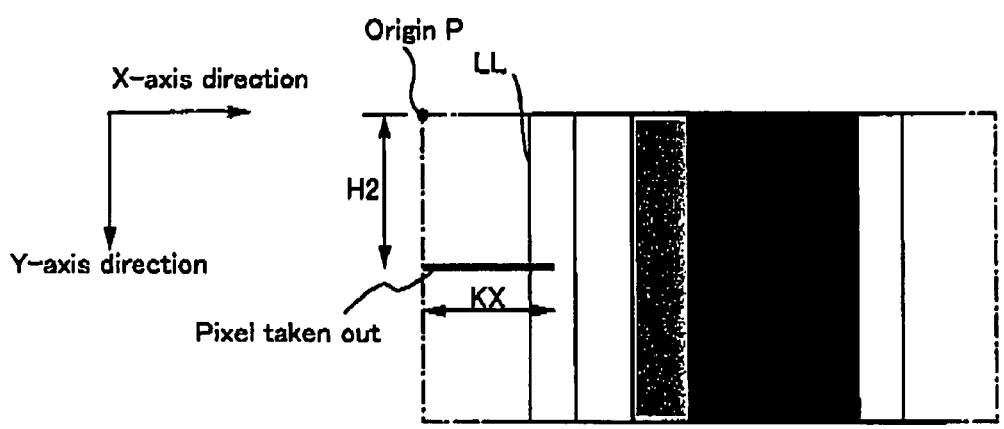
FIG. 20 is a diagram for explaining detection of a left ruled line.
Figure 21:
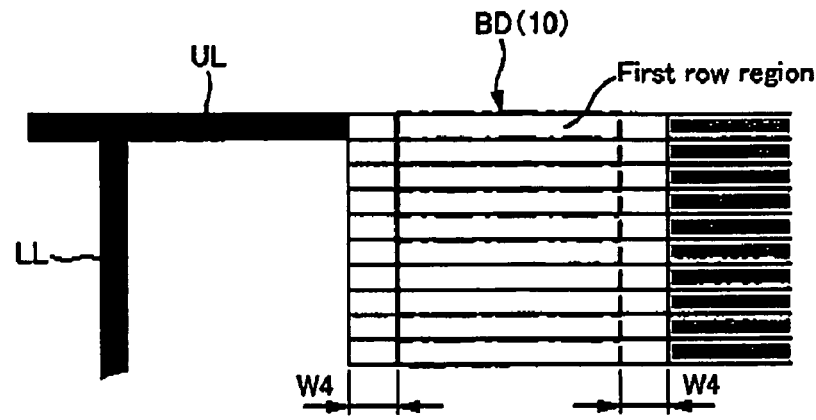
FIG. 21 is a diagram explaining density reading scope of a band-like pattern.

Next, the host-side controller 310 obtains the density of each row region in the correction pattern HP (S245). FIG. 20 is a diagram for explaining detection of the left ruled line LL. FIG. 21 is a diagram explaining the reading scope of the density of the band-like pattern BD. In obtaining the density of each row region, the host-side controller 310 detects the position of vertical ruled line (in this case, the left ruled line LL) that serves as the reference. The host-side controller 310 obtains the image density data for pixels in the predetermined scope from the image data that has been subjected to resolution conversion. For example, as shown in FIG. 20, the image density data is obtained for KX pixels along the x-axis direction that are located separated from the origin P by a distance of H2 in the y-axis direction. It should be noted that the number of pixels in the x-axis direction (KX) is determined so that pixel density data corresponding to the left ruled line LL is included in the obtained pixel density data group. Then, the host-side controller 310 obtains the gravity center position for the obtained pixel density data (gradation value). The gravity center position coincides with the central position of the left ruled line LL. Here, with respect to the x-axis direction, the spacing from the left ruled line LL to each band-like pattern BD is known. Therefore, the host-side controller 310 specifies pixels constituting each band-like pattern BD (BD(10) to BD(100)) using the gravity center position of the left ruled line LL as the reference, and obtains the pixel density data for those specified pixels. For example, for the band-like pattern BD(10) printed at 10% density, the pixel density data is obtained for each pixel in the scope enclosed with the dashed line except for the scope W4. The average value of the obtained pixel density data is used as the read density for 10% density for the first row region. Similarly, read density for other row regions and band-like patterns BD are obtained. The read density corresponds to the measured value of the density by the scanner 200. The obtained read density is stored in the data table (see FIG. 3) of the memory 312 of the host-side controller 310. That is, the read density is stored in an area specified by the color of ink, the print density of the pattern, and the row region number. It should be noted that the density 1 through 5 in FIG. 3 represent density of the band-like patterns BD. For example, density 1 corresponds to 10% density, and density 5 corresponds to 100% density.

<Setting of Correction Values>

After the read density of the row regions are obtained, the host-side controller 310 sets correction values for each of the row regions (S250). As described above, one band-like pattern BD is printed at a constant gradation value. However, the obtained read density of each of the row regions vary. This variance causes density non-uniformity in printed images. In order to eliminate the density non-uniformity, it is required to make the read density of each of the row regions of each of the band-like patterns BD to be uniform as much as possible. From this point of view, the correction values are set for each of the row regions based on the read density of each of the row regions. As described above, the test pattern CP includes a plurality of correction patterns HP printed in each color (each type) of ink, and each correction pattern HP includes band-like patterns BD printed in different predetermined density. Further, the band pattern BD has a plurality of row regions. Therefore, it can be said that the correction values are set for each of different colors and different density. Further, it is possible to say that the correction values are set in the band-like pattern BD (region printed at a predetermined density), for each of a plurality of row regions that area defined lined up in the carrying direction.

Figure 22:
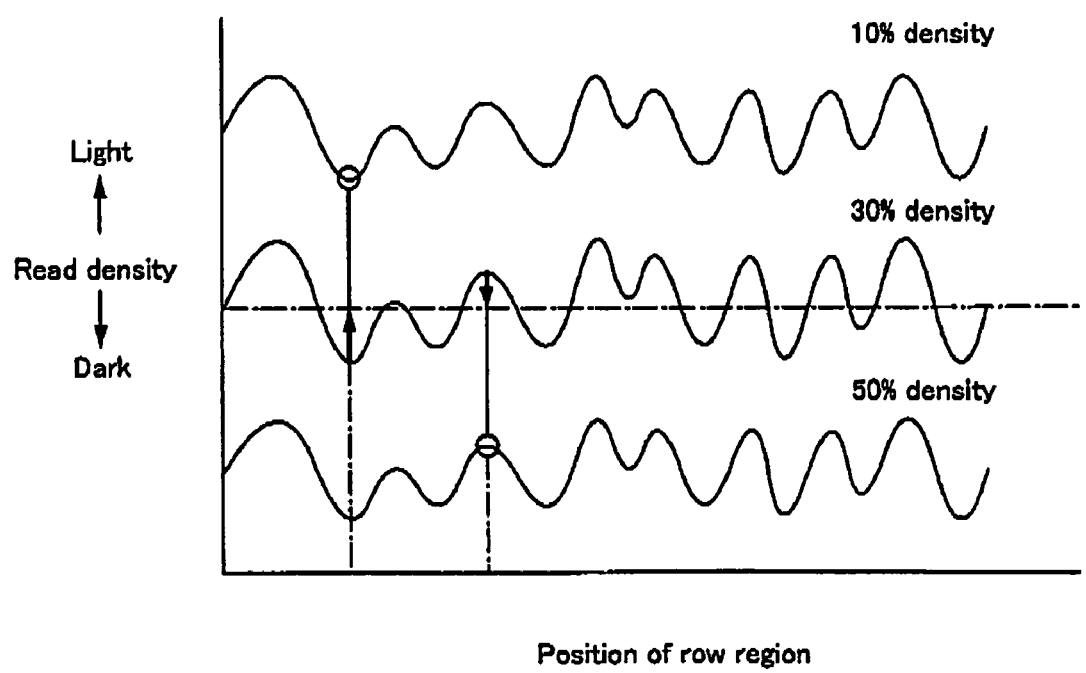
FIG. 22 is a diagram explaining an example of a combination of read density used to set correction values.
Figure 23A:
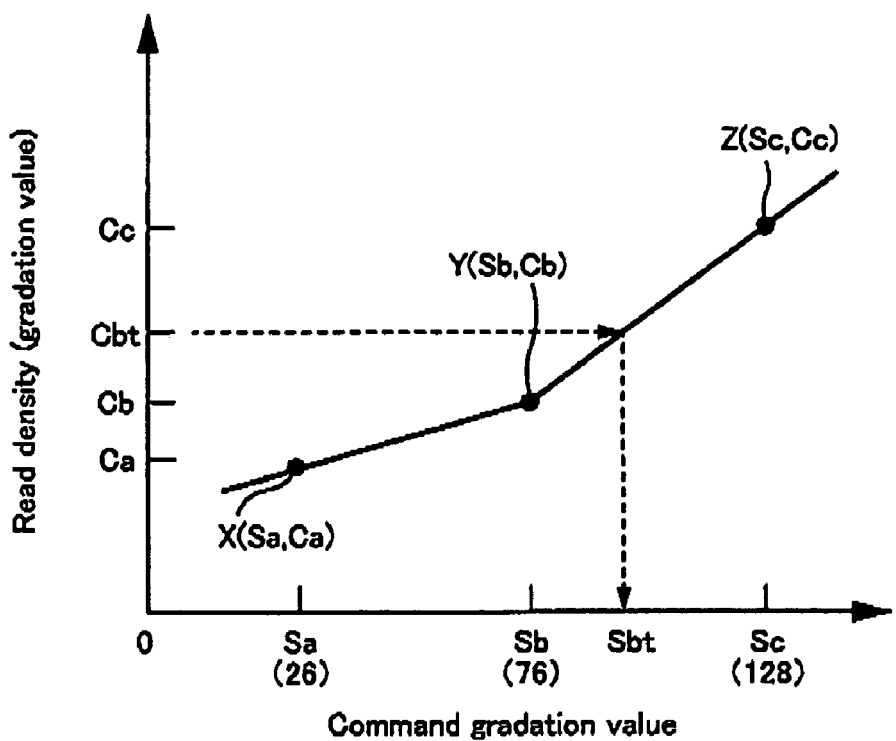
FIG. 23A is a diagram explaining setting of correction values in a case where the read density is lower than a target density.
Figure 23B:
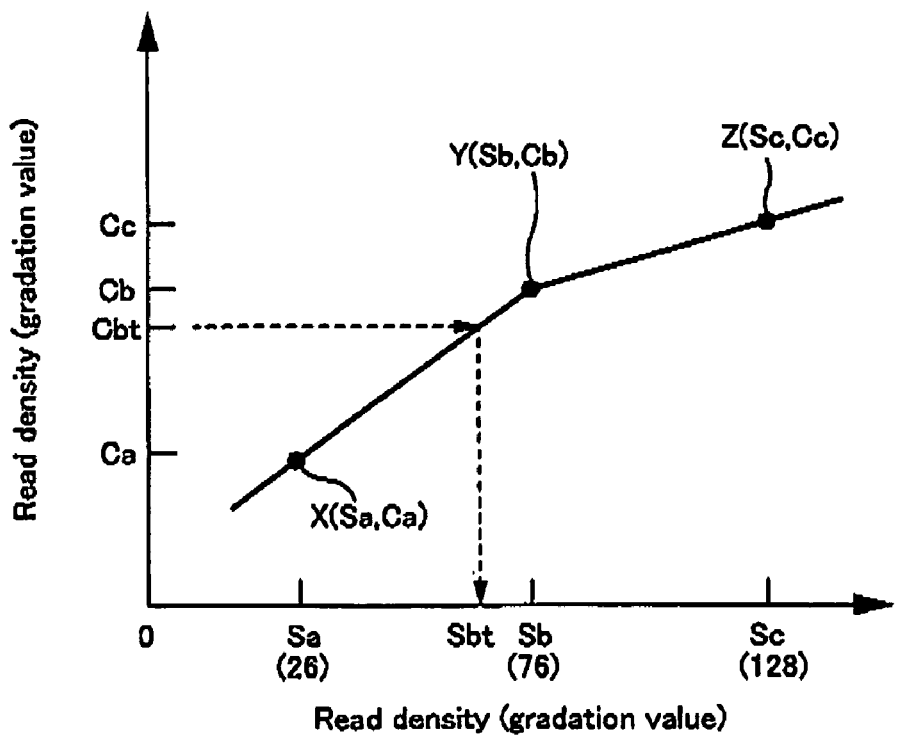
FIG. 23B is a diagram explaining setting of correction values in a case where the read density is higher than the target density.

Here, a case is described as an example in which a correction value is set for the command gradation value Sb (30% density, gradation value 76) in a certain row region. FIG. 22 is a diagram explaining an example of combination of read density used for setting correction values. FIG. 23A is a diagram explaining setting of the correction values when the read density is lower than the target density. FIG. 23B is a diagram explaining setting of the correction values when the read density is higher than the target density.

In the correction value setting system 1000, the host-side controller 310 sets a target density for the subject density for which correction values are set. In this example, for the band-like pattern BD at the subject density, the average value of the read density in each of the row regions is set as the target density. The correction value of a certain row region is determined according to the deviance from the target density. Specifically, it can be said that in setting the correction values, non-uniformity in density of each of the row regions is evaluated.

Also, at the time of setting correction values for each of the row regions, the host-side controller 310 refers to the read density of a higher side density that is higher than the subject density and the read density of a lower side density that is lower than the subject density. These higher side density and lower side density are specified arbitrarily as described below. In setting correction values for a certain density, a combination of a combination of the command gradation value (print command value) and the read density of the row region (measured value of the density of the printed region) corresponding to the higher side density, a combination of the command gradation value and the read density of the printed region corresponding to the lower side density, and a combination of the print command value corresponding to a certain density and the measured value of the density at the certain density are used. In the example shown in FIG. 22, when the correction values for the command gradation value Sb (30% density) are to be set, the read density of the command gradation value Sc (50% density, gradation value 128) is used as the higher side density. On the other hand, the read density of the command gradation value Sa (10% density, gradation value 26) is used as the lower side density.

For example, if the read density in a certain row region is lower than the target density, as shown in FIG. 23A, the correction value is set based on the read density Cb and the command gradation value Sb of the certain row region, and the read density Cc and the command gradation value Sc of the row region corresponding to the higher side density. Specifically, the host-side controller 310 performs linear interpolation indicated by the expression (3) below (linear interpolation based on the straight line YZ), calculates the command gradation value Sbt corresponding to the target density, and sets a correction value Hb by performing the calculation indicated by the expression (4) below.

$$Sbt = Sb + (Sc - Sb) \times \{(Cbt - Cb)/(Cc - Cb)\} \qquad (3)$$

$$Hb = (Sbt - Sb)/Sb \qquad (4)$$

For example, if the read density in a certain row region is higher than the target density, as shown in FIG. 23B, the correction value is set based on the read density Cb and the command gradation value Sb of the certain row region, and the read density Ca and the command gradation value Sa of the row region corresponding to the lower side density. Specifically, the host-side controller 310 performs a linear interpolation indicated by the expression (5) below (linear interpolation based on the straight line XY), and calculates the command gradation value Sbt corresponding to the target density, and sets a correction value Hb by performing the calculation indicated by the above expression (4).

$$Sbt = Sb - (Sb - Sa) \times \{(Cbt - Cb)/(Ca - Cb)\} \qquad (5)$$

$$Hb = (Sbt - Sb)/Sb \qquad (4)$$

The host-side controller 310 sets the correction value Hb for the gradation value Sb (30% density) for each of the row regions by performing the above calculation for each of the row regions. Similarly, the correction value Hc for the gradation value Sc (50% density) is set for each of the row regions. In this case, the read density of the command gradation value Sd (70% density, gradation value 179) is used as the higher side density, and the read density of the command gradation value Sb (36% density, gradation value 76) is used as the lower side density. Further, The correction value Hd for the gradation value Sd (70% density) is set for each of the row regions. The correction values Hb, Hc and Hd set as described above are temporarily stored in the memory 312 of the host-side controller 310 (working memory, for example), and thereafter, are stored in the memory 152 of the printer-side controller 150.

In this way, when setting the correction value, since the correction value is set based on the combination of the measured value of the density and the corresponding print command value, it is possible to set the correction value with good precision. Moreover, since the correction value is set using linear interpolation, calculation can be simplified and can be speeded up. Since correction values are set for a large number of printer 100 at a factory, speeding up of the calculation is advantageous in improving manufacturing efficiency.

Incidentally, as described above, with respect to a group of raster lines formed by the normal process, the combination of the nozzles Nz used to form each of the raster lines has a periodicity. Therefore, the correction value for the normal process area is set taking this periodicity into consideration. Specifically, the correction values are set for row regions corresponding to one cycle. In this case, a provisional correction value for each of a plurality of cycles is obtained for each row region, and the average of the provisional correction values of the corresponding row region is obtained to be used as the correction value of that row region.

<Storage of the Correction Values>

Figures 24, 25:
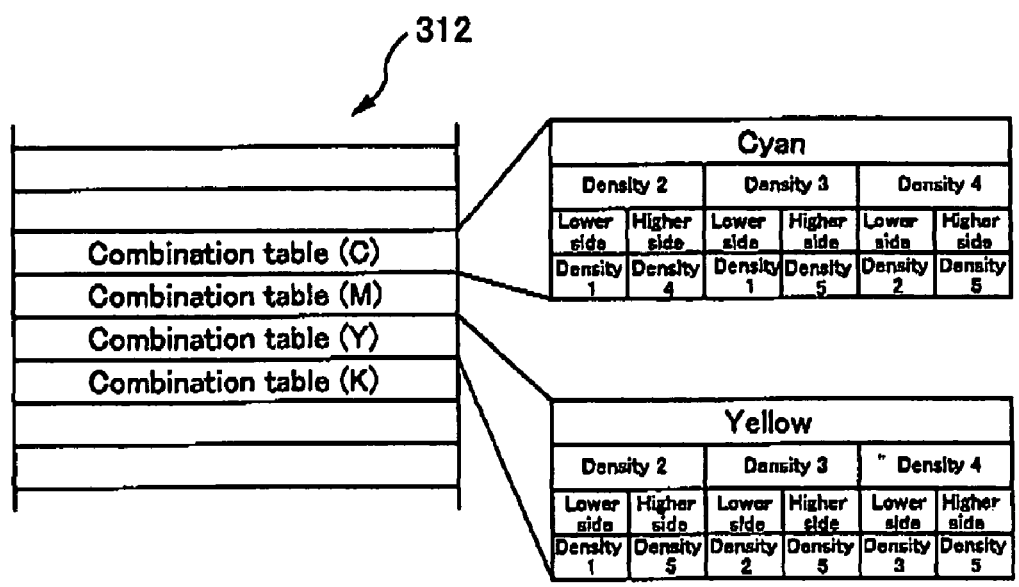
FIG. 24 is a diagram for explaining correction values stored in a correction value storage section.
FIG. 25 is a conceptual diagram for explaining a combination table provided in a part of a memory of a host-side controller.

After correction values are set, the host-side controller 310 stores the set correction values in the memory 152 of the printer-side controller 150 (correction value storage section 152a) (S255). FIG. 24 is a diagram for explaining correction values stored in the correction value storage section 152a. In this case, the host-side controller 310 communicates with the printer 100, thus assuring a state in which correction values can be stored. The host-side controller 310 then transfers the correction values stored in the memory 312 of the host-side controller 310 so that the correction values are stored in the memory 152 of the printer-side controller 150. As shown in FIG. 11, the correction value storage section 152a is provided with a storage area for the upper end process correction values, a storage area for the normal process correction values, and a storage area for the lower end process correction values. Also as shown in rig. 24 in detail, a plurality of these storage areas are provided for the row regions. It should be noted that the storage area of the normal process area is, as described above, provided in the number corresponding to one cycle. Therefore, in the correction value storage section 152a, three types of correction values for different density are stored for each of the row regions. In addition, this group of correction values is provided for each type of ink. It should be noted that in FIG. 24, density 2 means that the density is the second lowest density, and 30% density corresponds to this in the present embodiment. In the same manner, density 3 corresponds to 50% density, and density 4 corresponds to 70% density.

Regarding Characteristic Points of the Correction Value Setting

<Regarding the Higher Side Density and the Lower Side Density that are Used>

As described above, in the present embodiment, in setting correction values for a certain density, the density of the test pattern is measured to obtain a measured value of density (S245), a higher side density and a lower side density to be referenced according to the measured value of a region printed at a certain density are specified, and at the same time the correction values for the certain density are set using at least one of the measured value of the density corresponding to the higher side density and that of the density corresponding to the lower side density (S250). In this case, a relation between the command gradation value (print command value) and the read density (brightness) of a printed band-like pattern BD varies depending on the type of ink. For example, even at the same density, dark color ink (i.e. black ink, cyan ink) and light color ink (i.e. yellow ink) show different read density. Generally, brightness of light color ink tends to be higher than that of dark color ink at the same command gradation. Because of such a difference, if the combination of the higher side density and the lower side density to be referenced is specified uniformly when setting correction values for a certain density, depending on the type of ink and the density for which the correction values are set, difference between the measured value of the subject density and the measured value of the higher side density and/or that of the lower side density becomes small, which might impair precision of the correction value.

Accordingly, in the correction value setting system 1000, in setting correction values for a certain density, the higher side density that is higher than the certain density and the lower side density that is lower than the certain density to be referenced according to the measured value of a region printed at a certain density are each specified arbitrarily. The correction values for the certain density are set using at least one of the measured value of the density of the region printed at the higher side density that is arbitrarily specified and the measured value of the density of the region printed at the lower side density that is arbitrarily specified. This point is described below.

<Regarding the Combination Table>

First, a combination table is described in which combinations of the higher side density and the lower side density to be referenced are stored. FIG. 25 is a conceptual diagram for explaining the combination table provided in a part of the memory 312 of the host-side controller 310. As shown in FIG. 25, storage areas are provided for each of the ink types in the combination table. In the printer 100 of the present embodiment, it is possible to eject four colors of ink, i.e. cyan, magenta, yellow and black, and therefore four storage areas are provided corresponding to the respective colors. The storage area of each color is divided according to each of the density for which correction values are set (hereinafter also referred to as "subject density"). In this embodiment, since correction values are set for three density of 30% density (density 2), 50% density (density 3), and 70% density (density 4), three storage areas are provided. In addition, a storage area of each density is provided with a storage area for storing lower side density information and a storage area for storing higher side density information.

The operator stores information on the lower side density arbitrarily specified and information on the higher side density arbitrarily specified in corresponding storage areas. Specifically, information on the lower side density arbitrarily specified and information on the higher side density arbitrarily specified is stored in storage areas defined according to the type of ink and the subject density. In the example of FIG. 25, with respect to cyan ink that is one type of dark color inks, when the subject density is 30% density (density 2), the lower side density and the higher side density are specified as 10% density (density 1) and 70% density (density 4), respectively. In the same manner, when the subject density is 50% density (density 3), the lower side density and the higher side density are specified as 10% density (density 1) and 100% density (density 5), respectively. Also, with respect to yellow ink that is one type of light color inks, when the subject density is 30% density (density 2), the lower side density and the higher side density are specified as 10% density (density 1) and 100% density (density 5), respectively. In the same manner, when the subject density is 70% density (density 4), the lower side density and the higher side density are specified as 50% density (density 3) and 100% density (density 5), respectively.

<Setting of Correction Values>

Correction values are set in the procedure described above. At this time, the host-side controller 310 sets correction values using higher side density information and lower side density information stored in the combination table of the memory 312. In other words, correction values for the subject density are set by performing linear interpolation (see FIGS. 23A and 23B) using the read density of the arbitrarily specified higher side density and that of the arbitrarily specified lower side density, and the read density of the subject density.

Figures 26A, 26B, 27:
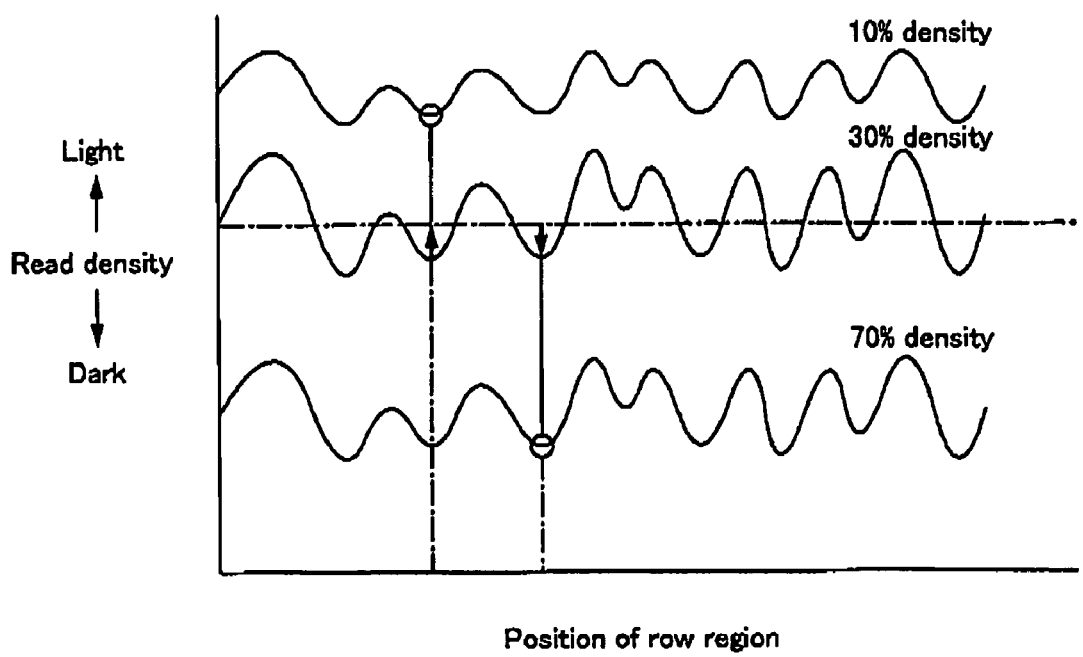
FIG. 26A is a conceptual diagram showing a lower side density and a higher side density that are referred to when setting correction values for cyan ink at 30% density.
FIG. 26B is a conceptual diagram indicating a lower side density and a higher side density that are referred to when setting correction values for cyan ink at 50% density.
FIG. 27 is a conceptual diagram explaining setting of correction values for cyan ink at 30% density.

FIG. 26A is a conceptual diagram showing the lower side density and the higher side density referred to when setting correction values for cyan ink at 30% density. FIG. 26B is a conceptual diagram showing the lower side density and the higher side density referred to in setting correction values for cyan ink at 50% density. FIG. 27 is a conceptual diagram explaining setting of correction values for cyan ink at 30% density. As shown in these figures, when setting correction values for cyan ink at 30% density (density 2, subject density), the read density of 10% density (density 1, lower side density) and that of 70% density (density 4, higher side density) are referred to. When setting correction values for cyan ink at 50% density (density 3, subject density), the read density of 10% density (density 1, lower side density) and that of 100% density (density 5, higher side density) are referred to.

As explained in FIGS. 23A and 23B, when setting correction values for the subject density, the host-side controller 310 performs linear interpolation using a combination of the read density of the subject density and the corresponding command gradation value, a combination of the read density of the higher side density and the corresponding command gradation value, and a combination of the read density of the lower side density and the corresponding command gradation value.

In this way, even for various types of ink or subject density, it is possible to provide a sufficient difference between the read density of the higher side density and that of the subject density. In the same manner, it is possible to provide a sufficient difference between the read density of the lower side density and that of the subject density. As a result, the precision of the correction values that are set can be improved.

In addition, since the lower side density information and the higher side density information corresponding to the subject density is stored in the combination table, it is possible to omit an operation to input the lower side density information and the higher side density information. As a result, when the printer 100 of the same model is mass-produced, it is possible to improve working efficiency, which improves manufacturing efficiency.

Processes by Users

<Printing System>

After correction values are stored in the memory 152 (correction value storage section 152a) of the printer-side controller 150 as in the above procedure, the printer 100 is, subjected to other inspections and thereafter shipped from the factory. Upon shipment, a CD-ROM storing the printer driver 330 is packed together with the printer 100. Then, a user who purchases the printer 100 connects the printer 100 to a computer possessed by the user (a computer different from the computer 300 at the factory, of course), thus constructing a printing system. Here, the printing system refers to a system including at least a printing apparatus in which correction values are set and a print controlling device. The print controlling device is constituted by, for example, a computer possessed by the user on which application programs and a printer driver are installed. The correction values stored in the memory 152 of the printer 100 may be transferred to the computer when the printer driver is installed. It is also possible that the computer 300 refers to the correction values stored in the memory 152 when performing printing. It should be noted that the provision of printer driver is not limited to by a CD-ROM, but may be downloaded via a communication line.

<Printing Operation>

Figure 28:
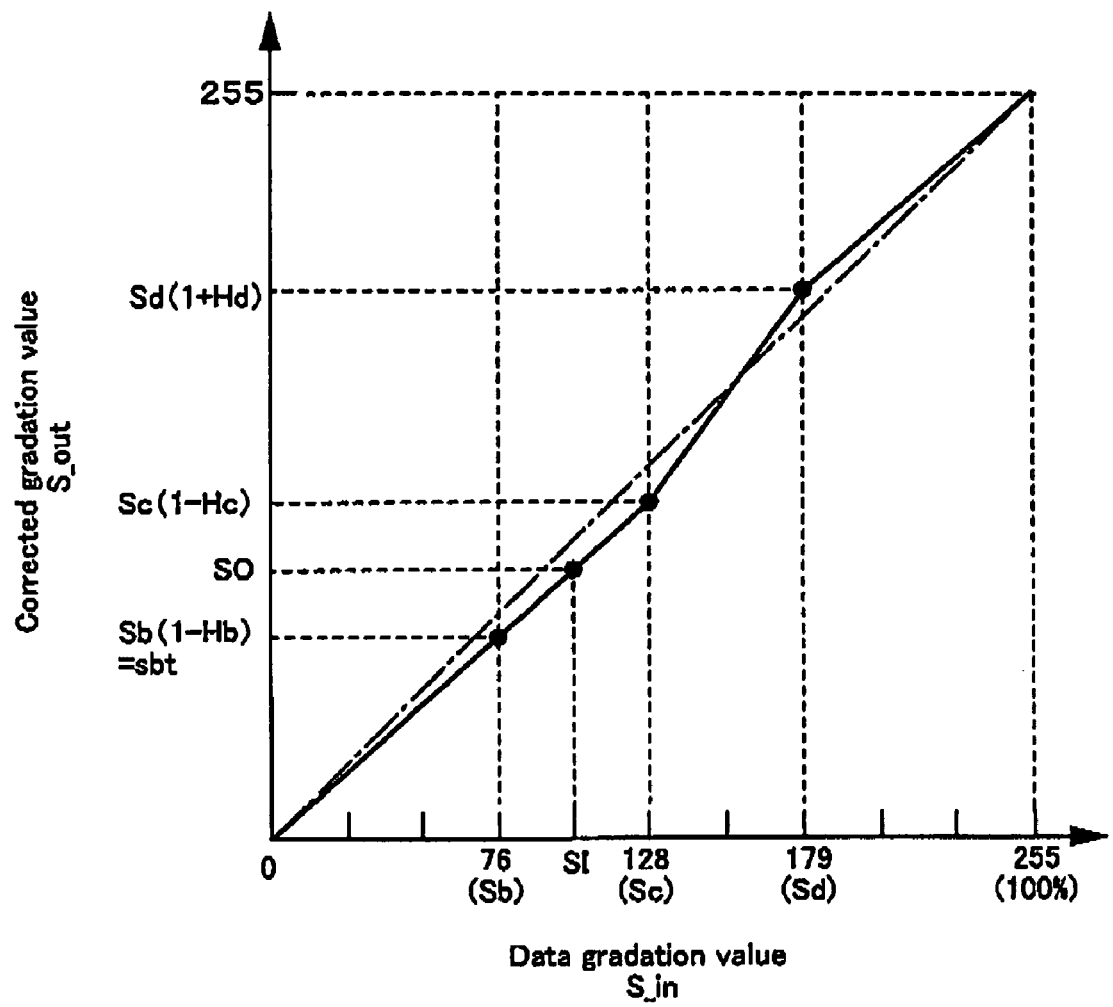
FIG. 28 is a diagram for explaining density correction process on pixel data.

Once powered on, the printer 100 waits for print data to be transmitted from the computer. When print data is transmitted from the computer, the printer 100 performs print operation. Basic operations of this print operation are the same as those for the test pattern CP. Therefore, detailed explanation is omitted. The print operation by a user differs from that for the test pattern CP in that pixel data is corrected for each row region using correction values. That is, the host-side controller of the computer carries out density correction process after a color conversion process. Then multiple gradation pixel data after density correction is subjected to a halftoning process, which is described below. FIG. 28 is a diagram for explaining a density correction process on pixel data. The density correction process is a process in which the gradation value of each piece of pixel data is corrected based on the correction values. Correction values used in this case are those set corresponding to each row region. As described above, in this embodiment, three correction values that correspond to 30% density (gradation 76), 50% density (gradation 128) and 70% density (gradation 179) are associated to that row region. The host-side controller corrects pixel data in the unit regions in that row region, based on these three correction values. In other words, a corrected gradation value S_out is obtained from the gradation value S_in of the pixel data obtained through the color conversion process, and this gradation value S_out is subjected to a halftoning process.

When the gradation value S_in of the pixel data before correction is the same as the command gradation value Sb, if the host-side controller corrects the gradation value S_in to a target command gradation value Sbt, it is possible to form dots corresponding to the target density Cbt for that pixel on the paper. On the other hand, if the gradation value S_in of the pixel data before correction is a gradation value SI that is different from the command gradation value, a gradation value SO to be outputted is obtained by linear interpolation as shown in FIG. 28, for example However, there is no limitation to this. It is also possible to interpolate between each of the correction values (Hb, Hc and Hd) that correspond to each of the command gradation values, with a curved line.

By the above-described density correction process, with respect to a row region that tends to be recognized dark, the gradation value of pixel data (CMYK data) in unit regions corresponding to that row region is corrected to a lower value. On the other hand, with respect to a row region that tends to be recognized light, the gradation value of pixel data in unit regions corresponding to that row region is corrected to a higher value. The printer driver carries out similar correction process to row regions of other colors as well.

By outputting print data generated as described above to the printer 100, the density of image pieces corresponding to each row region in the printed image printed by the printer 100 is corrected, and the density non-uniformity in the entire image can be suppressed.

Other Embodiments

In the foregoing embodiment, the correction value setting system 1000 having the printer 100 was mainly discussed. However, the foregoing description also includes the disclosure of a method for setting correction values and a correction value setting apparatus. Moreover, the foregoing embodiment is for the purpose of elucidating the present invention, and is not to be interpreted as limiting the present invention. The invention can of course be altered and improved without departing from the gist thereof, and includes functional equivalents. In particular, embodiments mentioned below are also included in the present invention.

<Regarding Setting of the Correction Values>

In the foregoing embodiment, the read value (measured value) of the higher side density and the read value (measured value) of the lower side density are used in setting correction values for a certain density, but it is possible to improve the precision of the correction values by using at least one of these read values of density. Also, although a case in which correction values are set for each row region was described, the present invention can be applied in cases in which correction values are set for each density in the same manner.

<Regarding Printing Method>

In the foregoing embodiment, interlace printing was described as an example of the printing method, but the printing method is not limited to this. For example, it is also possible to use an overlap printing method. The overlap printing method is a printing method in which one raster line is formed by a plurality of different nozzles Nz.

<Regarding Printing System>

Regarding the printing system, a printing system in which the printer 100 serving as the printing apparatus and the computer 300 serving as the print controlling device are configured separately was discussed in the foregoing embodiment. However, the present invention is not limited to this configuration. For example, the printing system can include the printing apparatus and the print controlling device as a single unit. Moreover, the printing system can also include a scanner as a single unit constituting a printer-scanner complex apparatus. With this complex apparatus, it is easy to set correction values again by the user. In short, it is possible to construct the correction value setting system easily.

<Regarding the Ink>

Since the foregoing embodiment was an embodiment of the printer 100, a dye ink or a pigment ink was ejected from the nozzles Nz. However, the ink that is ejected from the nozzles Nz is not limited to such inks.

<Other Exemplary Applications>

Moreover, although the printer 100 was described in the foregoing embodiment, the present invention is not limited to this. For example, technology similar to that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Moreover, methods and manufacturing methods of these are also within the scope of application.

What is claimed is:

1. A method for setting a correction value comprising:

obtaining, by a density measuring device, a measured value of density associated with both the region and the row region, by measuring density of a test pattern that includes a plurality of groups composed of a plurality of regions for each type of ink that are printed on a medium based on different command densities by repeating in alternation an operation for causing ink to be ejected toward the medium while a print head is moved in a movement direction, and an operation for carrying the medium in a carrying direction that intersects the movement direction for each of a plurality of row regions lined up in the carrying direction; and selecting, by a controller, for a certain command density, a higher side command density that is higher than the certain command density and a lower side command density that is lower than the certain command density, based on higher side command density information and lower side command density information to be referenced that are stored in a memory; and setting, by the controller, a correction value for the certain command density for each of the row regions by using linear interpolation based on:

at least one of a combination of a measured value of the density of a region printed based on the selected higher side command density and a print command value corresponding to the higher side command density, and a combination of a measured value of the density of a region printed based on the selected lower side command density and a print command value corresponding to the lower side command density, and a combination of a measured value of the density at the certain command density and a print command value corresponding to the certain command density.

* * * * *